(12) United States Patent
Shimomura et al.

(10) Patent No.: US 9,592,807 B2
(45) Date of Patent: Mar. 14, 2017

(54) BRAKE CHAMBER, BOOT MEMBER, AND BUSH MEMBER

(75) Inventors: Takeo Shimomura, Tokyo (JP); Akinori Nishimura, Tokyo (JP)

(73) Assignee: Nabtesco Automotive Corporation, Tokyo (JP)

( * ) Notice: Subject to any disclaimer, the term of this patent is extended or adjusted under 35 U.S.C. 154(b) by 530 days.

(21) Appl. No.: 14/110,894

(22) PCT Filed: Apr. 16, 2012

(86) PCT No.: PCT/JP2012/060801
§ 371 (c)(1),
(2), (4) Date: Dec. 19, 2013

(87) PCT Pub. No.: WO2012/141341
PCT Pub. Date: Oct. 18, 2012

(65) Prior Publication Data
US 2014/0096678 A1    Apr. 10, 2014

(30) Foreign Application Priority Data

Apr. 14, 2011  (JP) ................................. 2011-090039
Apr. 14, 2011  (JP) ................................. 2011-090047
May 19, 2011  (JP) ................................. 2011-112525

(51) Int. Cl.
F01B 7/00    (2006.01)
B60T 11/00   (2006.01)
B60T 17/08   (2006.01)

(52) U.S. Cl.
CPC ............ B60T 11/00 (2013.01); B60T 17/083 (2013.01)

(58) Field of Classification Search
CPC ............................... B60T 11/00; B60T 17/083
(Continued)

(56) References Cited

U.S. PATENT DOCUMENTS 4,508,018 A * 4/1985 Choinski ............... B60T 17/083
                                                                  29/517
5,536,101 A * 7/1996 Schwarzler ............. F16D 1/072
                                                                 403/274
(Continued)

FOREIGN PATENT DOCUMENTS

CN       101091066 A    12/2007
DE       1 906 818 A1   10/1969
(Continued)

OTHER PUBLICATIONS

European Search Report of EP 12771723.9 dated Mar. 22, 2016.

Primary Examiner — Thomas E Lazo
Assistant Examiner — Daniel Collins
(74) Attorney, Agent, or Firm — Christensen Fonder Dardi PLLC

(57) ABSTRACT

A brake chamber includes a rod member that makes reciprocating motion within a cylinder through a pressure of compressed air or an urging force of a spring, thereby causing a pushrod for activating a brake device of a vehicle to proceed into the brake device. The brake chamber further includes a diaphragm that deforms in response to supply of the compressed air to push the rod member, and a housing that forms an accommodation space for the diaphragm. The housing is connected to the cylinder with a first end of the cylinder being inserted in the housing. The brake chamber further includes a boot member connected to the cylinder and the rod member. The boot member includes a sealing portion to prevent entry of foreign matter into a connection portion between the housing and the cylinder by contacting an inner circumferential surface of the housing.

12 Claims, 11 Drawing Sheets

(58) Field of Classification Search
USPC .............................................................. 92/63
See application file for complete search history.

(56) References Cited

U.S. PATENT DOCUMENTS

| | | | |
|---|---|---|---|
| 5,558,345 A | | 9/1996 | Kobayashi et al. |
| 5,636,562 A | * | 6/1997 | Choinski ............... B60T 17/086 |
| | | | 92/17 |
| 5,655,431 A | * | 8/1997 | Pierce ................... B60T 17/083 |
| | | | 411/361 |
| 5,779,551 A | * | 7/1998 | Stall .......................... F16D 1/06 |
| | | | 403/284 |
| 2005/0092172 A1 | | 5/2005 | Anderson |
| 2006/0188328 A1 | | 8/2006 | Gutierrez et al. |

FOREIGN PATENT DOCUMENTS

| | | |
|---|---|---|
| DE | 39 35 663 A1 | 5/1991 |
| EP | 0 025 559 A1 | 3/1981 |
| FR | 2 409 177 A1 | 6/1979 |
| GB | 2308628 A | 7/1997 |
| GB | 2469090 A | 10/2010 |
| JP | 47-3924 | 2/1972 |
| JP | 07-190202 A | 7/1995 |
| JP | 2005-030555 A | 2/2005 |
| JP | 2005-133945 A | 5/2005 |
| JP | 3710477 B2 | 8/2005 |
| JP | 2006-123873 A | 5/2006 |
| JP | 2008-151213 A | 7/2008 |
| WO | WO 95/26895 A1 | 10/1995 |
| WO | WO 99/39082 | 8/1999 |

* cited by examiner

BRAKE CHAMBER, BOOT MEMBER, AND BUSH MEMBER

RELATED APPLICATIONS

The present is a National Phase entry of PCT Application No. PCT/JP2012/060801, filed Apr. 16, 2012, which claims priority from Japanese Patent Application No. 2011-090039, filed Apr. 14, 2011, Japanese Patent Application No. 2011-090047, filed Apr. 14, 2011, and Japanese Patent Application No. 2011-112525, filed May 19, 2011, the disclosures of which are hereby incorporated by reference herein in their entirety.

FIELD OF THE INVENTION

The present invention relates to a brake chamber including a rod member that makes reciprocating motion within a cylinder through the pressure of compressed air or the urging force of a spring, thereby causing a pushrod for activating a brake device of a vehicle to proceed into the brake device. The present invention also relates to a boot member in the brake chamber that functions to prevent entry of foreign matter into the cylinder.

The present invention further relates to a bushing member in the brake chamber that is located between the outer circumference of the rod member and the inner circumference of the cylinder and makes reciprocating motion integrally with the rod member while making sliding contact with the inner circumference of the cylinder.

The present invention also relates to a brake chamber with a structure in which a release bolt releases a piston that causes a pushrod for activating a brake device of a vehicle to proceed into the brake device.

BACKGROUND OF THE INVENTION

A brake system provided for example in a large automobile includes an air brake that uses compressed air supplied from an air compressor as an energy source for braking. This air brake includes a pushrod that pushes a brake shoe outward and a brake chamber provided to drive the pushrod. The brake chamber houses a diaphragm that deforms in response to supply of the compressed air to push the pushrod against the brake shoe (see Patent Document 1, for example).

This brake chamber may include a service brake chamber for braking during running of a vehicle that applies brakes on wheels by compressed air, and a spring brake chamber operating as a parking brake that is arranged side by side with the service brake chamber. In the spring brake chamber, a spring is contracted by the pressure of compressed air so that a piston inside the chamber does not push the pushrod in a non-braking state. In a braking state, the compressed air is removed so that the pushing force of the spring acts on the pushrod, thereby activating the brake.

Specifically, in the spring brake chamber, the pressure of compressed air contracts the spring so that the piston inside the chamber does not push the pushrod in a non-braking state. In a braking state, the compressed air is removed so that the pushing force of the spring acts on the piston to make the piston push the pushrod, thereby activating the brake.

If air leakage occurs in a supply route along which compressed air is supplied to the spring brake chamber, the spring keeps pressing the piston, specifically the brake is kept activated and this activation cannot be canceled. Therefore, the spring brake chamber is provided with a release bolt with which the spring brake is cancelled manually (see Patent Document 1, for example). Specifically, rotating the release bolt shifts the piston to a brake release position, thereby allowing the spring brake to be cancelled.

PRIOR ART DOCUMENT

Patent Document

Patent Document 1: Japanese Patent No. 3710477

SUMMARY OF THE INVENTION

The aforementioned brake chamber may be provided with a member called a push plate that pushes the pushrod. The push plate includes a flange portion to be pressed by the diaphragm that deforms in response to supply of compressed air, and a rod portion that presses the pushrod. The rod portion makes reciprocating motion within the cylinder.

A space in which the push plate is accommodated is expanded and reduced in response to deformation of the diaphragm. Hence, an opening may be formed in part of a housing forming the accommodation space for the diaphragm to allow air transfer to and from outside. In this case, foreign matter such as mud may enter the inside of the housing through the opening and the foreign matter may further invade the inside of the cylinder, causing a risk of inhibiting the operation of the push plate. Thus, a dust boot may be provided to prevent entry of such foreign matter into the cylinder. In this case, a first end and a second end of the dust boot are attached to a distal end of the cylinder and the rod portion, respectively.

The housing forming the accommodation space for the diaphragm and the aforementioned cylinder may not be formed integrally but they may be formed separately and then connected. In this case, foreign matter such as mud may also reach the connection portion. If the housing and the cylinder are connected by welding, for example, moisture in foreign matter may rust the welded part, causing a risk of strength reduction at the connection portion. Meanwhile, additionally providing means dedicated to preventing entry of foreign matter with the intention of solving this problem in turn leads to cost increase of the system.

Accordingly, it is an objective of the present invention to provide a brake chamber that has a structure for connecting a housing forming an accommodation space for a push plate and a cylinder accommodating a pushrod to each other, and prevents the problem of strength poverty at the connection portion between the housing and the cylinder due to foreign matter entering the inside of the housing while suppressing cost increase.

For reasons of manufacture or in terms of the performance of sliding motion, the brake chamber may be configured such that a bushing member is provided between the outer circumference of a rod portion and the inner circumference of the cylinder, and the bushing member makes reciprocating motion within the cylinder integrally with the rod portion while making sliding contact with the inner circumference of the cylinder. A dust boot intended to prevent entry of foreign matter into the cylinder may be provided. In this case, a first end and a second end of the dust boot are attached to a distal end of the cylinder and the rod portion, respectively.

In consideration of the performance of sliding motion of the bushing member within the cylinder, it is preferable that a clearance between the outer circumferential surface of the bushing member and the inner circumferential surface of the cylinder be as small as possible. While the bushing member moves within the cylinder, air is transferred between a destination and a source of the movement of the bushing member. Hence, reducing the clearance between the outer circumferential surface of the bushing member and the inner circumferential surface of the cylinder in turn makes it difficult to transfer air between the destination and the source of the movement of the bushing member. As a result, resistance is generated against the movement of the bushing member, making it impossible to guarantee smooth movement while causing a risk of generating abnormal noise (whistling noise) within the cylinder.

The present invention has been made in view of these circumstances. In a brake chamber including a bushing member arranged between a rod portion for pushing a pushrod and a cylinder, a second objective of the invention is to ensure smooth sliding motion of the rod portion (bushing member) within the cylinder.

An end of the aforementioned release bolt is provided with a nut giving a hold to the rotation of the release bolt. Conventionally, regarding attachment of this nut, the nut is fixed to the end of the release bolt by press fitting, for example, making the attachment troublesome work. This fixation by press fitting causes a problem that the nut cannot be removed easily for repair of the brake chamber, for example.

Meanwhile, a detent may be formed for example by forming the end of the release bolt into a shape with protrusions and recesses arranged along the circumference thereof and forming the nut into a shape with protrusions and recesses that is fitted to the protrusions and the recesses of the end. At the same time, the nut may be retained with a retaining ring. In this case, however, retaining strength may become insufficient.

The present invention has been made in view of these circumstances. A third objective of the invention is to obtain a brake chamber with a nut attachment structure that allows a nut to be attached to and separated from a release bolt easily while making it possible to maintain sufficient retaining strength after attachment of the nut.

To achieve the foregoing objective and in accordance with a first aspect of the present invention, a brake chamber includes a rod member, a diaphragm, a housing, and a boot member. The rod member makes reciprocating motion within a cylinder through the pressure of compressed air or the urging force of a spring, thereby causing a pushrod for activating a brake device of a vehicle to proceed into the brake device. The diaphragm deforms in response to supply of the compressed air to push the rod member. The housing forms an accommodation space for the diaphragm. The housing is connected to the cylinder with a first end of the cylinder being inserted in the housing. The boot member has a first end connected to the cylinder and a second end connected to the rod member. The boot member functions to prevent entry of foreign matter into the cylinder. The brake chamber is characterized in that the boot member includes a sealing portion that functions to prevent entry of foreign matter into a connection portion between the housing and the cylinder by contacting an inner circumferential surface of the housing.

According to this aspect, the boot member functioning to prevent entry of foreign matter into the cylinder includes the sealing portion that functions to prevent entry of foreign matter into the connection portion between the housing and the cylinder by contacting the circumferential surface of the housing. Thus, attaching the boot member forms a means for preventing entry of foreign matter into the connection portion between the housing and the cylinder.

Specifically, the boot member functioning to prevent entry of foreign matter into the cylinder is used as a means for preventing entry of foreign matter into the connection portion between the housing and the cylinder. This solves the problem of strength poverty due to entry of foreign matter into the connection portion between the housing and the cylinder while suppressing cost increase.

In accordance with a second aspect of the present invention, the brake chamber according to the first aspect is characterized in that the sealing portion has a structure to receive a force acting in a direction to cause the sealing portion to contact the inner circumferential surface of the housing in response to pressure applied from outside of a sealed space.

According to this aspect, the sealing portion has a structure to receive a force acting in the direction to cause the sealing portion to contact the inner circumferential surface of the housing in response to pressure applied from outside of the sealed space. This makes it possible to maintain sealing function even if pressure is applied from outside of the sealed space, so that the aforementioned operation and effect of the first aspect can be achieved reliably.

In accordance with a third aspect of the present invention, a boot member used in a brake chamber is provided. The brake chamber includes a rod member, a diaphragm, and a housing. The rod member makes reciprocating motion within a cylinder through the pressure of compressed air or the urging force of a spring, thereby causing a pushrod for activating a brake device of a vehicle to proceed into the brake device. The diaphragm deforms in response to supply of the compressed air to push the rod member. The housing forms an accommodation space for the diaphragm. The housing is connected to the cylinder with a first end of the cylinder being inserted in the housing. The boot member being characterized in that the boot member is fixed between the first end of the cylinder and the rod member and functions to prevent entry of foreign matter into the cylinder, and that the boot member includes a sealing portion that functions to prevent entry of foreign matter into a connection portion between the housing and the cylinder by contacting an inner circumferential surface of the housing.

As mentioned in the description of the first aspect, according to this aspect, the boot member functioning to prevent entry of foreign matter into the cylinder is used as a means for preventing entry of foreign matter into the connection portion between the housing and the cylinder. This solves the problem of strength poverty due to entry of foreign matter into the connection portion between the housing and the cylinder while suppressing cost increase.

To achieve the foregoing second objective, a brake chamber including a rod member and a bushing member is provided. The rod member makes reciprocating motion within a cylinder through the pressure of compressed air or the urging force of a spring, thereby causing a pushrod for activating a brake device of a vehicle to proceed into the brake device. The bushing member is located between an outer circumference of the rod member and an inner circumference of the cylinder. The bushing member makes reciprocating motion integrally with the rod member while making sliding contact with the inner circumference of the cylinder. The brake chamber is characterized in that the bushing member includes a plurality of through holes that extends through the bushing member in a direction of movement within the cylinder and is arranged in a circumferential direction.

According to this aspect, the bushing member makes reciprocating motion integrally with the rod portion while making sliding contact with the inner circumference of the cylinder, and this bushing member includes the through holes that extend through the bushing member in the direction of movement (direction of the reciprocating motion) within the cylinder while being arranged along the circumference (around the axis of the rod member). Thus, while the bushing member moves within the cylinder, air is transferred smoothly between a destination and a source of the movement of the bushing member through the through holes.

This ensures smooth sliding motion of the rod member (bushing member) within the cylinder while avoiding formation of a large clearance between the outer circumferential surface of the bushing member and the inner circumferential surface of the cylinder. This also prevents generation of abnormal noise within the cylinder.

In accordance with a fifth aspect of the present invention, the brake chamber according to the fourth aspect is characterized by a diaphragm, a housing, and a boot member. The diaphragm deforms in response to supply of the compressed air to push the rod member. The housing forms an accommodation space for the diaphragm. The housing is connected to the cylinder with a first end of the cylinder being inserted in the housing. The boot member has a first end connected to the cylinder and a second end connected to the rod member, wherein the boot member functions to prevent entry of foreign matter into the cylinder.

According to this aspect, the boot member is provided with functions to prevent entry of foreign matter into the cylinder. This in turn makes a closed space at least on one side of the direction of movement of the bushing member within the cylinder, so that the aforementioned resistance or abnormal noise is likely to occur during movement of the bushing member. This is prevented by the first aspect to ensure smooth sliding motion of the rod member (bushing member) within the cylinder while generation of abnormal noise within the cylinder is prevented.

In accordance with a sixth aspect of the present invention, the brake chamber according to the fourth or fifth aspect is characterized in that a pushrod guide, which engages with the pushrod, is formed at a distal end of the rod member, wherein the pushrod guide is made of a material higher in strength than the rod member. The bushing member includes a pawl portion, which engages with the distal end of the rod member. The pawl portion is located between a flange portion of the pushrod guide and the distal end of the rod member.

Using a light-weight material such as aluminum for forming the rod member works effectively to reduce the weight of the brake chamber. However, this in turn easily causes friction at a part (distal end) of the rod member where the rod member engages with the pushrod. Hence, it is preferable that a pushrod guide made of a material higher in strength than the rod member is provided at the part of the rod member where the rod member engages with the pushrod.

According to this aspect, in the aforementioned structure, the bushing member includes the pawl portion, which is placed between the distal end of the rod member and the pushrod guide. This eliminates the necessity for a means dedicated for fixation of the bushing member to the rod member, contributing to cost reduction of the system. Alternatively, this allows the bushing member to be attached more solidly to the rod member.

In accordance with a seventh aspect of the present invention, the brake chamber according to the sixth aspect is characterized in that the pushrod guide has a protruding shape to be inserted in a recess formed at the distal end of the rod member, and that the pushrod guide is fixed to the rod member with a fixing ring, which has an undulating shape in a circumferential direction and is located between the recess and the protruding shape.

According to this aspect, the pushrod guide is fixed to the recess formed at the distal end of the rod member with the fixing ring having an undulating shape along the circumference. This realizes attachment and removal of the pushrod guide more easily than fixation by press fitting. As a result, the entire length of the rod portion including the pushrod guide can be adjusted easily by providing a spacer at a bottom portion of the recess, for example.

In accordance with an eighth aspect of the present invention, the brake chamber according to the fourth or fifth aspect is characterized in that a pushrod guide, which engages with the pushrod, is formed at a distal end of the rod member, wherein the pushrod guide is made of a material higher in strength than the rod member. The rod member has a groove formed in a circumferential direction. The bushing member has a protrusion to be inserted in the groove. Insertion of the protrusion into the groove attaches the bushing member to the rod member. The bushing member further has a pawl portion, which engages with the distal end of the rod member. The protrusion and the pawl portion are shifted in phase in a circumferential direction of the bushing member.

As mentioned in the description of the sixth aspect, using a light-weight material such as aluminum for forming the rod member works effectively to reduce the weight of the brake chamber. In this case, it is preferable that a pushrod guide made of a material higher in strength than the rod member is provided at the part of the rod member where the rod member engages with the pushrod.

According to this aspect, in the aforementioned structure, the protrusion of the bushing member is inserted in the groove in the rod member, and the pawl portion of the bushing member engages with the distal end of the rod member, thereby attaching the bushing member to the rod member. As a result, the bushing member can be fixed to the rod member reliably.

Further, the protrusion and the pawl portion are shifted in phase in the circumferential direction of the bushing member. This allows easy demolding of the bushing member if the bushing member is formed by plastic molding, thereby achieving enhanced molding performance.

In accordance with a ninth aspect of the present invention, a bushing member used in a brake chamber is provided. The brake chamber includes a rod member that makes reciprocating motion within a cylinder through the pressure of compressed air or the urging force of a spring, thereby causing a pushrod for activating a brake device of a vehicle to proceed into the brake device. The bushing member is located between an outer circumference of the rod member and an inner circumference of the cylinder. The bushing member makes reciprocating motion integrally with the rod member while making sliding contact with the inner circumference of the cylinder. The bushing member is characterized by a plurality of through holes that extends through the bushing member in a direction of movement within the cylinder and is arranged in a circumferential direction.

As mentioned in the description of the fourth aspect, according to this aspect, the bushing member includes the through holes that extend through the bushing member in the direction of movement (direction of the reciprocating motion) within the cylinder while being arranged along the circumference (around the axis of the rod member). Thus, while the bushing member moves within the cylinder, air is transferred smoothly between a destination and a source of the movement of the bushing member through the through holes. This ensures smooth sliding motion of the rod member (bushing member) within the cylinder while avoiding formation of a large clearance between the outer circumferential surface of the bushing member and the inner circumferential surface of the cylinder. This also prevents generation of abnormal noise within the cylinder.

To achieve the foregoing third objective and in accordance with a tenth aspect of the present invention, a brake chamber is provided that is configured to include a flange portion and a hollow cylinder portion extending from the flange portion. The flange portion divides the inside of a housing into an accommodation space for a spring and a pressure space for compressed air. The brake chamber includes a piston, a release bolt, a nut, and a stopper. The piston causes a pushrod to proceed into a brake device of a vehicle. The pushrod activates the brake device by the urging force of the spring. The release bolt is threaded in a bolt hole formed in the housing. The release bolt has a first end inserted in the cylinder and a second end protruding out of the housing. When the release bolt is rotated, the first end displaces the piston against the urging force of the spring to a position where braking by the brake device is released. The nut has an insertion hole for receiving an end at the second end of the release bolt, wherein the nut is fixed to the second end of the release bolt. The stopper ring has an outer diameter larger than an inside diameter of the insertion hole. The stopper ring is attached to the second end of the release bolt with the second end inserted in the insertion hole, thereby preventing the nut from coming off the release bolt. The brake chamber being characterized in that the stopper ring is accommodated in a recess formed in the nut, and that an inner circumferential surface of the recess that faces the stopper ring has a slanting shape that makes the inner circumferential surface expand outwardly of the nut.

According to this aspect, the nut fixed to an end of the release bolt is retained with the stopper ring accommodated in the recess of the nut. Thus, the nut can be attached easily to the release bolt and can be separated easily from the release bolt by removing the stopper ring.

The inner circumferential surface of the recess of the nut facing the stopper ring has a slanting shape that makes the inner circumferential surface expand outwardly of the nut. Thus, if the nut tries to move in a direction causing the nut to comes off, this inner circumference functions to press the stopper ring from outside. Specifically, the stopper ring is pressed in a direction (direction in which the diameter thereof shrinks) opposite to a direction in which the stopper ring is removed (direction in which the stopper ring expands). Thus, the greater the extent of coming-off action of the nut, the more enhanced the stopper function of the stopper ring becomes. This ensures sufficient retaining strength after the nut is attached.

In accordance with an eleventh aspect of the present invention, the brake chamber according to the tenth aspect is characterized in that the second end of the release bolt has an outer circumference of a shape with protrusions and recesses defined in a circumferential direction, and that the insertion hole of the nut has a shape with protrusions and recesses that are fitted to the shape with the protrusions and recesses of the release bolt with a certain gap left between the shapes.

According to this aspect, the end of the second end of the release bolt has the outer circumference of a shape with protrusions and recesses defined along the circumference, and the insertion hole of the nut has a shape with protrusions and recesses that is fitted to the shape with protrusions and recesses of the release bolt while a certain gap is left between the shapes. Thus, while a detent of the nut is formed reliably, the nut can be separated easily.

In accordance with a twelfth aspect of the present invention, the brake chamber according to the tenth or eleventh aspect is characterized in that a bolt-side sealing surface is formed at the second end of the release bolt at a position further inward of the chamber than a place where the nut is attached. A housing-side sealing surface facing the bolt-side sealing surface is formed in the housing at a position further outward of the chamber than a terminal end position of the bolt hole. A sealing ring is provided between the bolt-side sealing surface and the housing-side sealing surface, thereby realizing sealing function in an area further inward of the chamber than the nut.

According to this aspect, "shaft sealing function" is achieved by the bolt-side sealing surface, the housing-side sealing surface, and the sealing ring provided between the bolt-side sealing surface and the housing-side sealing surface, and this shaft sealing function is realized in an area further inward of the chamber than the nut. Thus, both moisture entering the chamber from between the release bolt and the nut and moisture entering the chamber from between the nut and the housing are dealt with by one sealing means, thereby contributing to simplification and cost reduction of the structure.

DETAILED DESCRIPTION OF THE PREFERRED EMBODIMENTS

Figure 1:
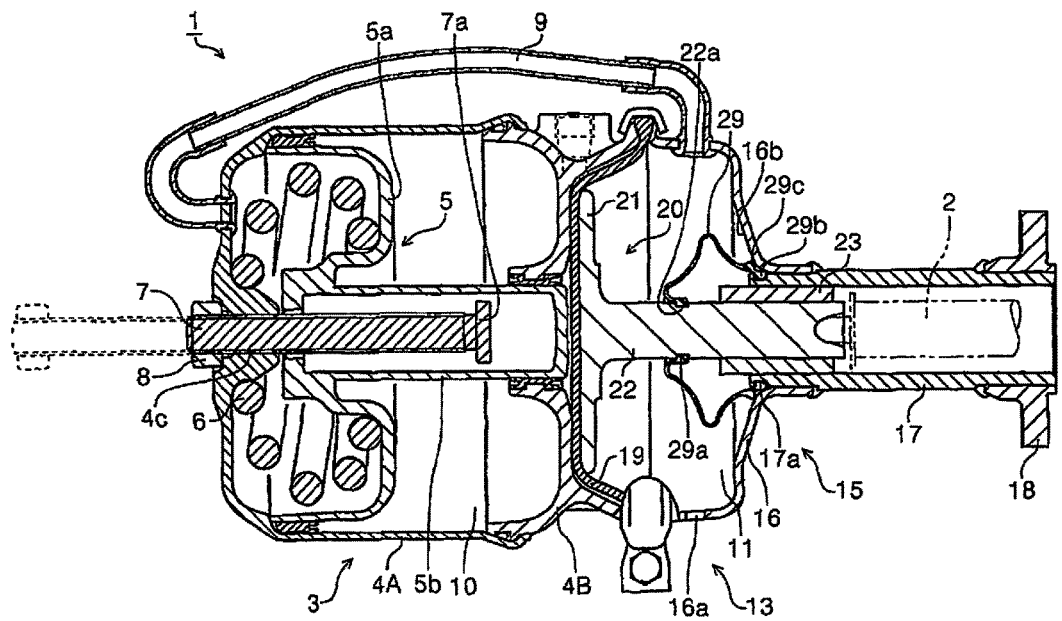
FIG. 1 is a cross-sectional side view of a brake chamber of the present invention.

An embodiment of the present invention will now be described by referring to the drawings. The embodiment is described below on condition that it is merely an embodiment of the present invention and is not intended to limit the invention.

Figure 2:
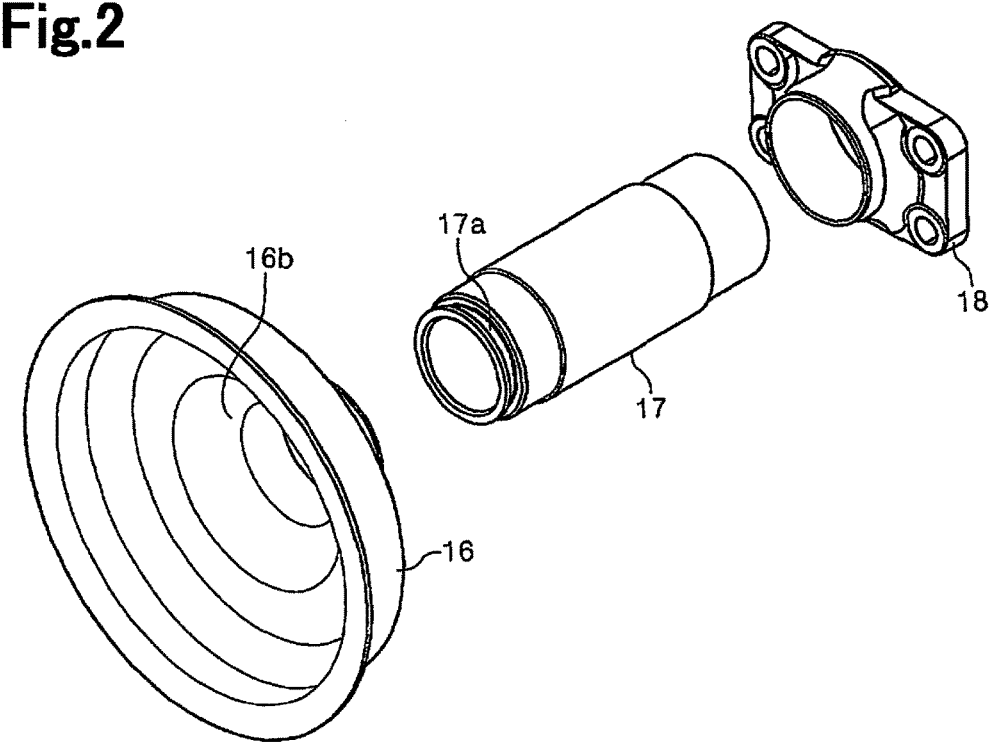
FIG. 2 is an exploded perspective view of a base.
Figure 3:
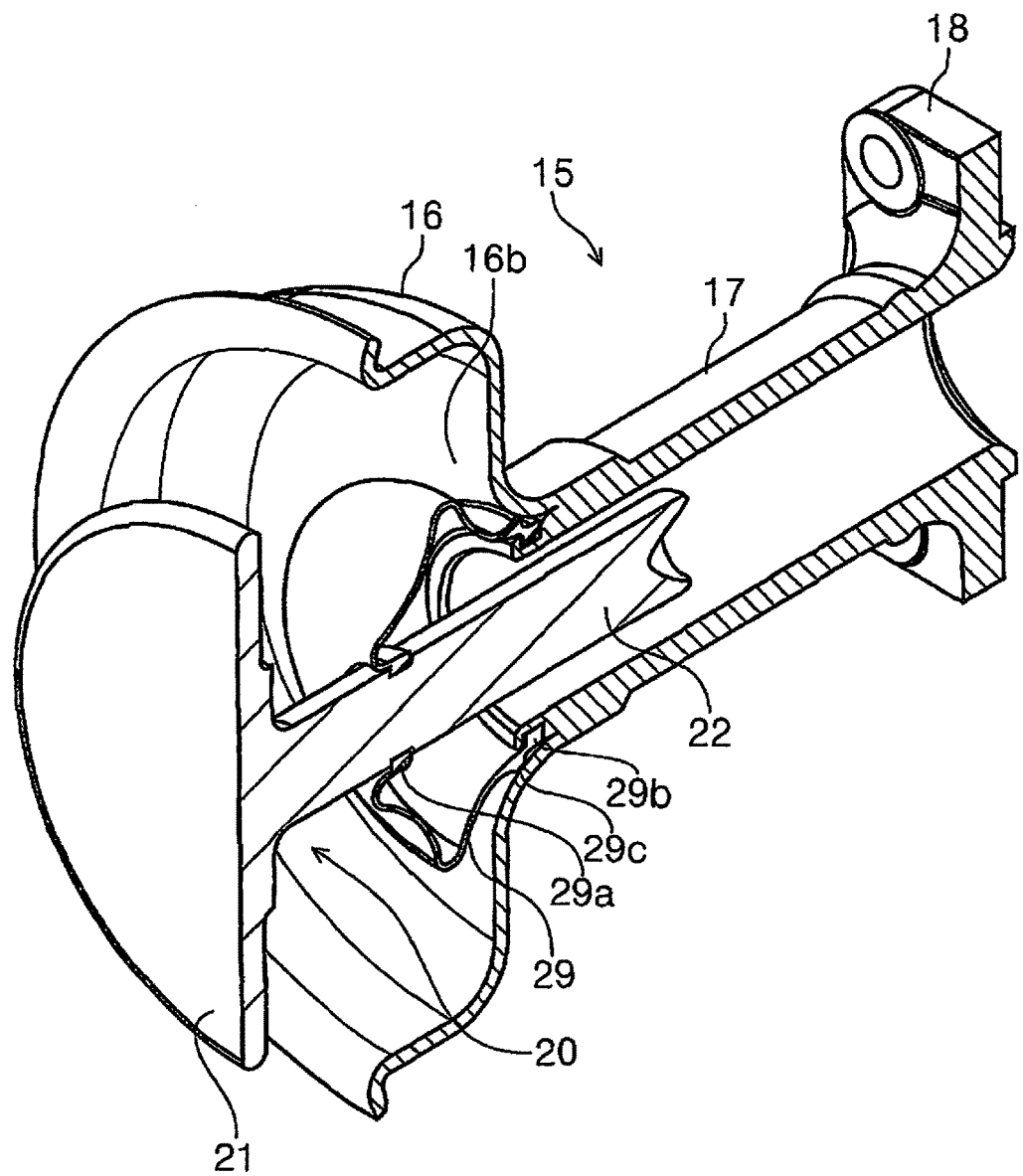
FIG. 3 is a cross-sectional perspective view showing the base, a push plate, and a dust boot.
Figure 4:
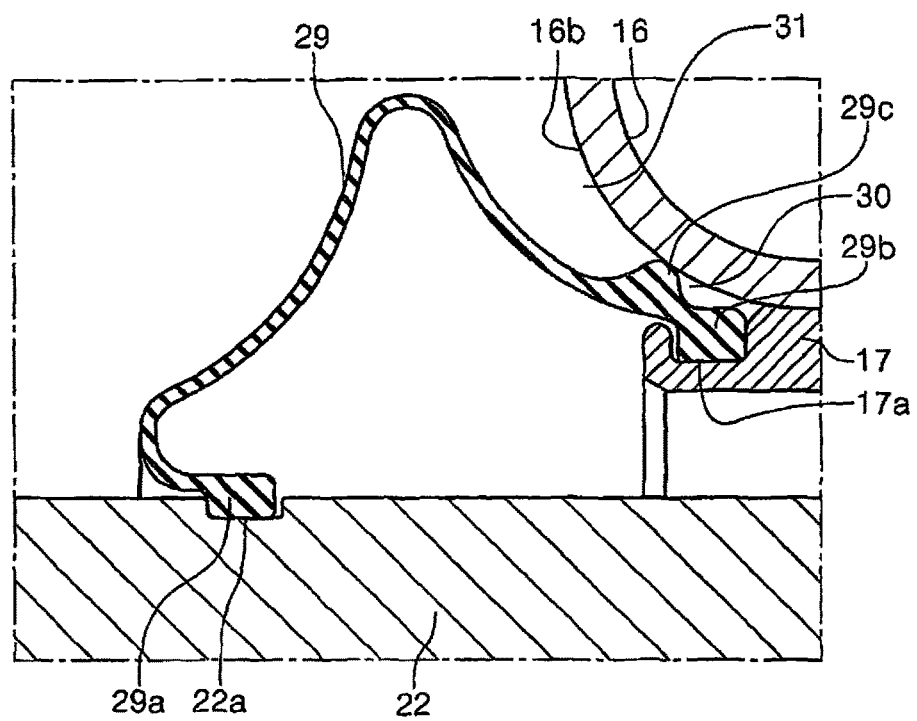
FIG. 4 is a cross-sectional side view of a part where the dust boot, a cup, and a cylinder are connected.
Figure 5:
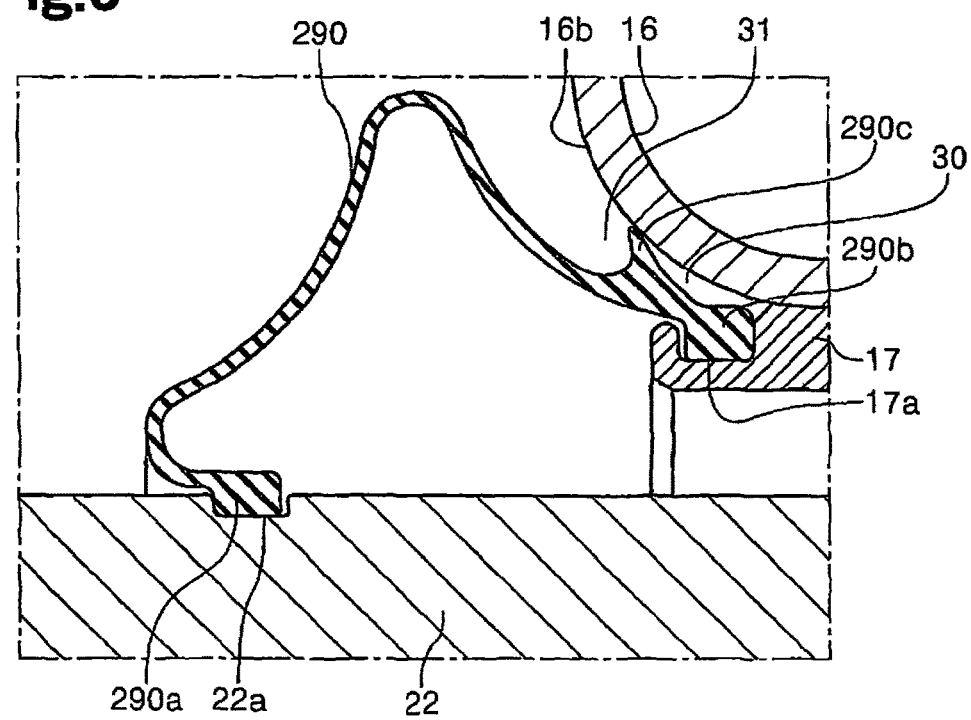
FIG. 5 is a cross-sectional side view of a part where the dust boot, the cup, and the cylinder are connected (in a different embodiment)

FIG. 1 is a cross-sectional side view of a brake chamber 1 of the present invention. FIG. 2 is an exploded perspective view of a base 15. FIG. 3 is a perspective view showing the cross sections of the base 15, a push plate 20, and a dust boot 29. FIG. 4 is a cross-sectional side view of a part where the dust boot 29, a cup 16, and a cylinder 17 are connected. FIG. 5 is a cross-sectional side view of a part where the dust boot 29, the cup 16, and the cylinder 17 are connected in a different embodiment.

In FIG. 1, a brake device (not shown) is provided on the right side of the brake chamber 1. A pushrod indicated by a sign 2 proceeds into the brake device to push a brake shoe of the brake device outward, thereby generating braking force.

The brake chamber 1 includes a service brake unit 13 as a service brake, and a spring brake unit 3 as a parking brake. One of the service brake unit 13 and the spring brake unit 3 pushes the pushrod 2 toward the brake device.

In the spring brake unit 3, a housing 4A and a housing 4B are connected to define an accommodation space for a spring 6 and a piston 5. The piston 5 of the spring brake unit 3 includes a flange portion 5a and a cylinder portion 5b. The spring 6 provided between the flange portion 5a and the housing 4A urges the cylinder portion 5b in a direction in which the cylinder portion 5b presses the push plate 20 of the service brake unit 13.

A space inside the housings 4A and 4B is divided by the flange portion 5a into a space where the spring 6 is arranged and a space 10 opposite to the space for the spring 6. Air tightness is maintained to prevent transfer of air between these spaces. A compressed air supply means (not shown) supplies compressed air into the space 10. In a non-braking state, the pressure of the compressed air makes the flange portion 5a contract the spring 6, as shown in FIG. 1. In response to parking brake operation, the compressed air in the space 10 is removed so the urging force of the spring 6 acts to make the piston 5 push the pushrod 2 through the push plate 20, thereby generating a brake activated state.

A release bolt 7 is threaded in a bolt hole 4c provided at a central portion of the housing 4A. One end of the release bolt 7 is placed inside the cylinder portion 5b of the piston 5. A flange portion 7a is formed at a distal end of a part of the release bolt 7 placed inside the cylinder portion 5b. Rotating a nut 8 fixed to the opposite end of the release bolt 7 allows the piston 5 to be moved manually to the left of FIG. 1, specifically in a brake cancelling direction against the urging force of the spring 6. Specifically, even if a failure occurs in a supply circuit for compressed air, the brake can be cancelled manually.

In the service brake unit 13, the housing 4B forming the spring brake unit 3 and the base 15 define an accommodation space for the push plate 20 and a diaphragm 19.

In an exemplary structure of the base 15, the base 15 is divided into the cup 16 as a housing, the cylinder 17, and a flange 18. The cylinder 17 has a first end to which the flange 18 is welded and a second end to which the cup 16 is welded, so that the cup 16, the cylinder 17, and the flange 18 are integrated.

The connection portion between the cylinder 17 and the cup 16, more specifically a distal end of the cylinder 17 is slightly inserted in the cup 16. In this state, the cylinder 17 and the cup 16 are fixed to each other.

The diaphragm 19 is held in a suspended manner between the housing 4B and the cup 16. Compressed air is supplied to between the diaphragm 19 and the housing 4B through a compressed air supply port (not shown). Supply of the compressed air to between the diaphragm 19 and the housing 4B deforms the diaphragm 19 to push the pushrod 2 through the push plate 20, thereby activating the brake.

The cup 16 is provided with an opening 16a communicating with the outside of the cup 16, so that internal space 11 of the service brake unit 13 defined by the housing 4B and the cup 16 can be expanded and reduced in accordance with deformation of the diaphragm 19. Hence, foreign matter such as mud or dirt may enter the internal space 11 from outside through the opening 16a and then invade the inside of the cylinder 17, causing a risk of inhibiting smooth sliding motion of a bushing member 23 described below.

In this respect, the dust boot 29 made of an elastically deformable material (such as rubber) and formed into a dome shape is fixed as a boot member between the cylinder 17 and a rod portion 22. The dust boot 29 has a first end 29a elastically fitted in a recessed groove 22a formed in the rod portion 22 along the circumference thereof and a second end 29b elastically fitted in a recessed groove 17a formed at the distal end of the cylinder 17 along the circumference thereof, thereby fixing the dust boot 29.

Reciprocating motion of the push plate 20 changes the distance between the recessed groove 22a in the rod portion 22 and the recessed groove 17a in the cylinder 17. Since, the dust boot 29 is made of an elastic material, the dust boot 29 elastically deforms in accordance with the aforementioned distance change, so that the dust boot 29 can maintain sealing function.

A sign 9 shows a communication pipe connecting the accommodation space for the spring 6 in the spring brake unit 3 and the space 11 in the service brake unit 13. Specifically, the accommodation space for the spring 6 in the spring brake unit 3 is basically sealed hermetically in order to prevent deterioration of the spring 6 due to moisture and the like. Meanwhile, the accommodation space for the spring 6 should be expanded and reduced in response to reciprocating motion of the piston 5. Thus, the communication pipe 9 is provided to achieve smooth transfer of air to and from the accommodation space for the spring 6.

The push plate 20 is composed of a flange portion 21 and the rod portion 22 as a rod member. In the present embodiment, the entire push plate 20 is molded integrally by aluminum forging and is intended to reduce the weight thereof. This is shown only as an example. The flange portion 21 and the rod portion 22 may be formed separately and then connected by welding, for example.

The bushing 23 of an annular shape is provided between the inner circumference of the cylinder 17 and the outer circumference of the rod portion 22. The bushing 23 is fixed to the rod portion 22. While making sliding contact with the inner circumference of the cylinder 17, the bushing 23 makes reciprocating motion within the cylinder 17 together with the rod portion 22.

The bushing 23 is provided for stable reciprocating motion of the rod portion 22. In the present embodiment, the bushing 23 is made of a plastic material. By creating an appropriate clearance between the bushing 23 and the inner circumference of the cylinder 17 or by ensuring an appropriate length in a direction in which the bushing 23 moves, tilt (twist) of the rod portion 22 toward the cylinder 17 is prevented.

The entire structure of the brake chamber 1 is as described above. Herein below, the dust boot 29 will now be described in more detail.

As described above, by referring to FIG. 4, the dust boot 29 has the first end 29a, which is elastically fitted in the recessed groove 22a formed in the rod portion 22 along the circumference thereof, and the second end 29b, which is elastically fitted in the recessed groove 17a formed at the distal end of the cylinder 17 along the circumference thereof, thereby fixing the dust boot 29.

The cylinder 17 and the cup 16 are connected by welding. Hence, entry of foreign matter, particularly moisture into the connection portion rusts this connection portion, causing a risk of strength poverty at this connection portion. Meanwhile, additionally providing a means dedicated to preventing entry of foreign matter with the intention of solving this problem in turn leads to cost increase of the system.

Thus, in the present invention, the dust boot 29 functioning to prevent entry of foreign matter into the cylinder 17 is provided with a sealing portion 29c that functions to prevent entry of foreign matter into the connection portion between the cup 16 and the cylinder 17 by elastically contacting an inner circumferential surface 16b of the cup 16.

The sealing portion 29c is formed to protrude outwardly while extending around the entire outer circumference of the dust boot 29. The sealing portion 29c is made of an elastic material (such as rubber) and formed integrally with the body of the dust boot 29. Thus, if attached to the dust boot 29, the sealing portion 29c can make elastic contact with the inner circumferential surface 16b of the cup 16 without involving particular work.

In this way, the sealing portion 29c elastically contacts the inner circumferential surface 16b of the cup 16 to prevent entry of foreign matter such as mud from a space 31 outside the seal into a space 30 inside the seal, thereby preventing a problem such as strength poverty at the connection portion between the cylinder 17 and the cup 16.

In the present embodiment, the sealing portion 29c is formed integrally with the dust boot 29. The sealing portion 29c may be a ring-like member and this member may be fixed to the dust boot 29 by means such as welding.

In the present embodiment, the sealing portion 29c is provided only in one position in a direction in which the sealing portion 29c realizes sealing function. The sealing portion 29c may be provided at multiple positions, and each of these sealing portions may be formed to elastically contact the inner circumferential surface 16b of the cup 16.

The sealing portion may also be embodied in a way shown in FIG. 5. Like the aforementioned dust boot 29, a dust boot 290 of FIG. 5 has a first end 290a elastically fitted in the recessed groove 22a formed in the rod portion 22 along the circumference thereof and a second end 290b elastically fitted in the recessed groove 17a formed at the distal end of the cylinder 17 along the circumference thereof, thereby fixing the dust boot 290.

Like the aforementioned dust boot 29, the dust boot 290 is provided with a sealing portion 290c, which functions to prevent entry of foreign matter into the connection portion between the cup 16 and the cylinder 17 by contacting the inner circumferential surface 16b of the cup 16.

The sealing portion 290c extends along the inner circumferential surface 16b of the cup 16 by a distance slightly longer than the aforementioned sealing portion 29c. Thus, the sealing portion 290c is configured to exert more force in a direction in which the sealing portion 290c contacts the inner circumferential surface 16b of the cup 16 in response to application of pressure from the outside 31 of the sealed space. This allows the sealing portion 290c to maintain sealing function more reliably even if pressure is applied from the outside 31 of the sealed space.

As described above, the specific shape of the dust boot, particularly that of the sealing portion can be devised in various ways. These shapes are included within the scope of the present invention as long as they do not depart from the purport of the invention.

A second embodiment of the present invention will be described below by referring to the drawings. The second embodiment is described below on condition that it is merely an embodiment of the present invention and is not intended to limit the invention.

Figure 6:
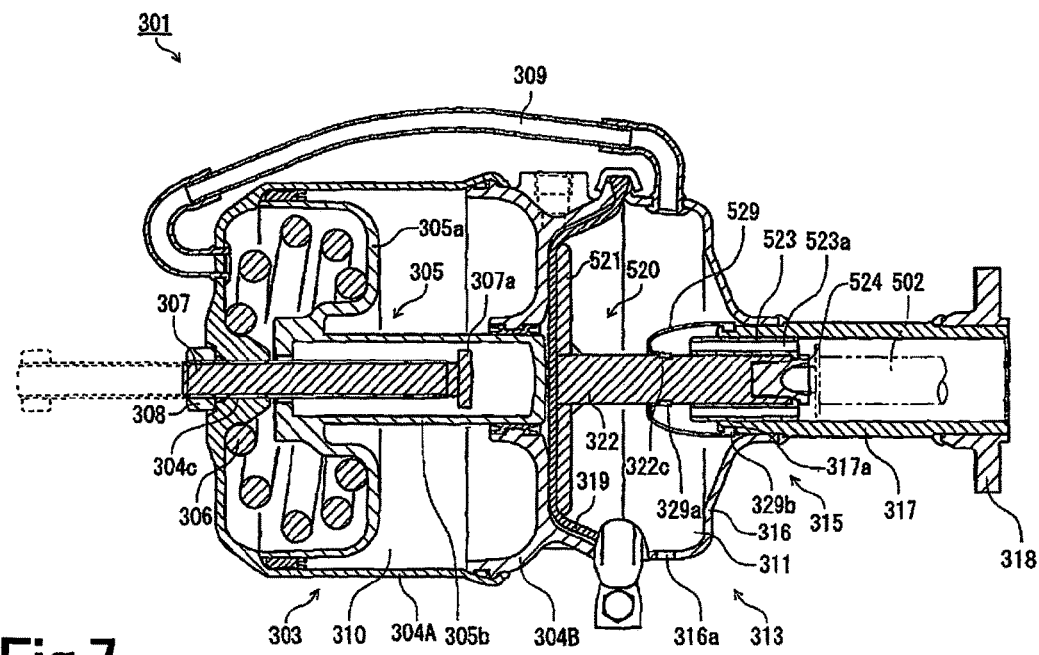
FIG. 6 is a cross-sectional side view of a brake chamber of the present invention.
Figure 7:
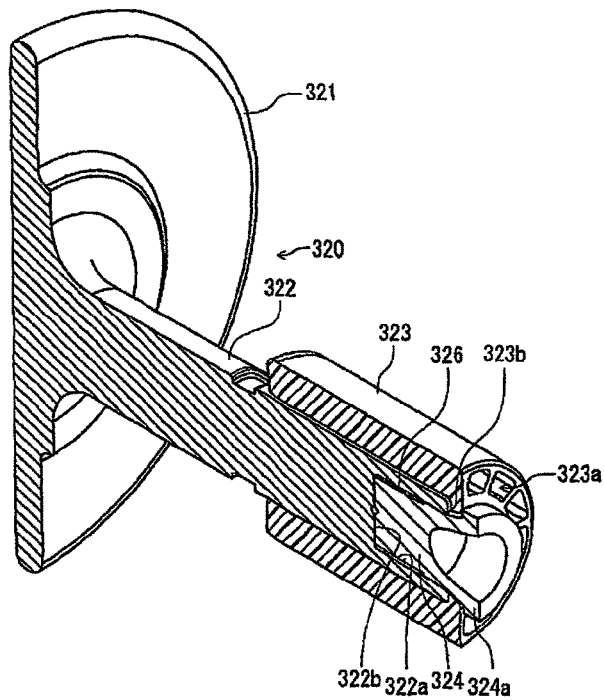
FIG. 7 is a cross-sectional perspective view showing an assembly of a push plate, a bushing and a pushrod guide.
Figure 8A:
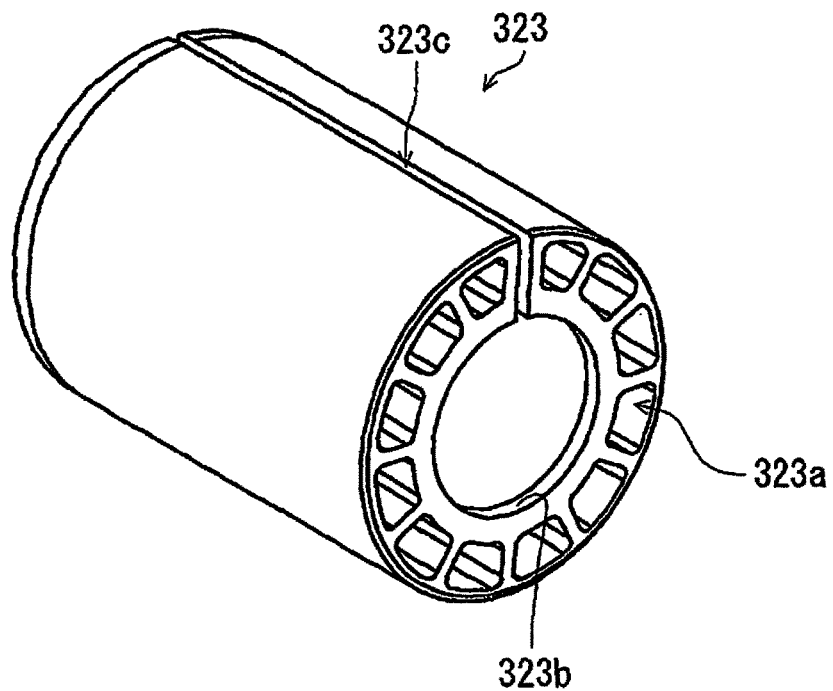
FIG. 8A is a perspective view of the bushing as seen from a distal end of a rod portion.
Figure 8B:
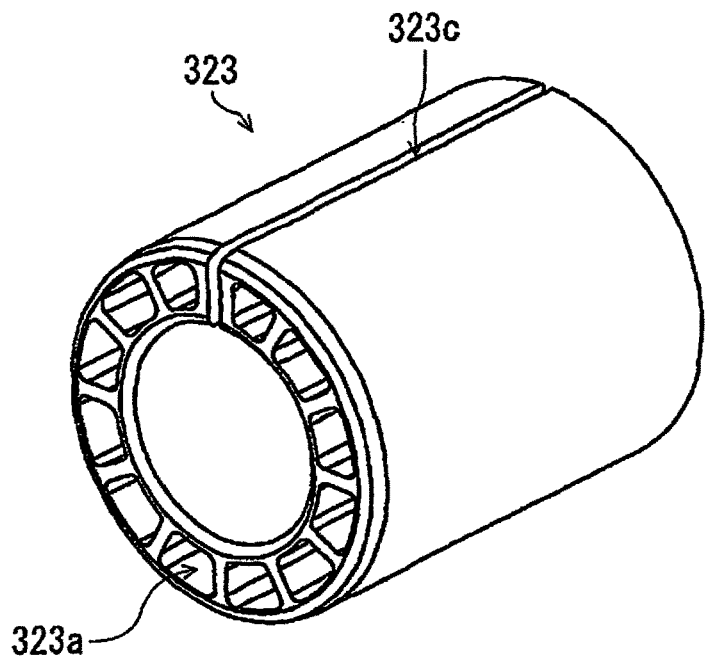
FIG. 8B is a perspective view of the bushing as seen from a proximal end of the rod portion.
Figure 9:
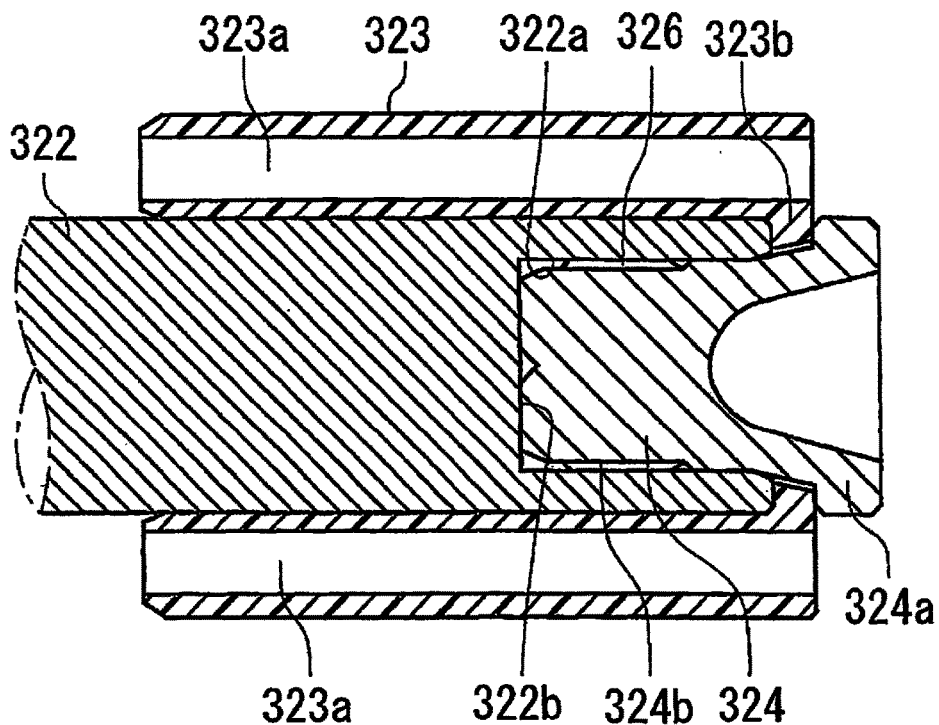
FIG. 9 is a cross-sectional view of an assembly of the distal end of the rod portion, the bushing and the pushrod guide.

FIG. 6 is a cross-sectional side view of a brake chamber 301 of the present invention. FIG. 7 is a perspective view of the cross section of an assembly of a push plate 320, a bushing 323, and a pushrod guide 324. FIG. 8A is a perspective view of the bushing 323 as seen from a distal end of a rod portion 322 (from the right side of FIG. 6). FIG. 8B is a perspective view of the bushing 323 as seen from a proximal end of the rod portion 322 (from the left side of FIG. 6). FIG. 9 is a cross-sectional view of an assembly of a distal end of the rod portion 322, the bushing 323, and the pushrod guide 324.

In FIG. 6, a brake device (not shown) is provided on the right side of the brake chamber 301. A pushrod indicated by a sign 302 proceeds into the brake device to push a brake shoe of the brake device outward, thereby generating braking force.

The brake chamber 301 includes a service brake unit 313 as a service brake, and a spring brake unit 303 as a parking brake. One of the service brake unit 313 and the spring brake unit 303 pushes the pushrod 302 toward the brake device.

In the spring brake unit 303, a housing 304A and a housing 304B are connected to define an accommodation space for a spring 306 and a piston 305. The piston 305 of the spring brake unit 303 includes a flange portion 305a and a cylinder portion 305b. The spring 306 provided between the flange portion 305a and the housing 304A urges the cylinder portion 305b in a direction in which the cylinder portion 305b presses the push plate 320 of the service brake unit 313.

A space inside the housings 304A and 304B is divided by the flange portion 305a into a space where the spring 306 is arranged and a space 310 opposite to the space for the spring 306. Air tightness is maintained to prevent transfer of air between these spaces. A compressed air supply means (not shown) supplies compressed air into the space 310. In a non-braking state, the pressure of the compressed air makes the flange portion 305a contract the spring 306, as shown in FIG. 6. In response to parking brake operation, the compressed air in the space 310 is removed so the urging force of the spring 306 acts to make the piston 305 push the pushrod 302 through the push plate 320, thereby generating a brake activated state.

A release bolt 307 is threaded in a bolt hole 304c provided at a central portion of the housing 304A. One end of the release bolt 307 is placed inside the cylinder portion 305b of the piston 305. A flange portion 307a is formed at a distal end of the portion of the release bolt 307 placed inside the cylinder portion 305b. Rotating a nut 308 fixed to the opposite end of the release bolt 307 allows the piston 305 to be moved manually to the left of FIG. 6, specifically in a brake cancelling direction against the urging force of the spring 306. Specifically, even if a failure occurs in a supply circuit for compressed air, the brake can be cancelled manually.

In the service brake unit 313, the housing 304B forming the spring brake unit 303 and a base 315 define an accommodation space for the push plate 320 and a diaphragm 319.

In an exemplary structure of the base 315, the base 315 is divided into a cup 316 as a housing, a cylinder 317, and a flange 318. The cylinder 317 has a first end to which the flange 318 is welded and a second end to which the cup 316 is welded, so that the cup 316, the cylinder 317, and the flange 318 are integrated.

The connection portion between the cylinder 317 and the cup 316, more specifically a distal end of the cylinder 317 is slightly inserted in the cup 316. In this state, the cylinder 317 and the cup 316 are fixed to each other.

The diaphragm 319 is held in a suspended manner between the housing 304B and the cup 316. Compressed air is supplied to between the diaphragm 319 and the housing 304B through a compressed air supply port (not shown). Supply of the compressed air to between the diaphragm 319 and the housing 304B deforms the diaphragm 319 to push the pushrod 302 through the push plate 320, thereby activating the brake.

The cup 316 is provided with an opening 316a communicating with the outside of the cup 316, so that internal space 311 of the service brake unit 313 defined by the housing 304B and the cup 316 can be expanded and reduced in accordance with deformation of the diaphragm 319. Hence, foreign matter such as mud or dirt may enter the internal space 311 from outside through the opening 316a and then invade the inside of the cylinder 317, causing a risk of inhibiting smooth sliding motion of the bushing member 323 described below. In this respect, a dust boot 329 made of an elastically deformable material (such as rubber) and formed into a dome shape is fixed as a boot member between the cylinder 317 and the rod portion 322. The dust boot 329 has a first end 329a elastically fitted in a recessed groove 322c formed in the rod portion 322 along the circumference thereof and a second end 329b elastically fitted in a recessed groove 317a formed at the distal end of the cylinder 317 along the circumference thereof, thereby fixing the dust boot 329.

Reciprocating motion of the push plate 320 changes the distance between the recessed groove 322c in the rod portion 322 and the recessed groove 317a in the cylinder 317. Meanwhile, the dust boot 329 is made of an elastic material. Thus, the dust boot 329 elastically deforms in accordance with the aforementioned distance change, so that the dust boot 329 can maintain sealing function.

A sign 309 shows a communication pipe connecting the accommodation space for the spring 306 in the spring brake unit 303 and the space 311 in the service brake unit 313. Specifically, the accommodation space for the spring 306 in the spring brake unit 303 is basically sealed hermetically in order to prevent deterioration of the spring 306 due to moisture and the like. Meanwhile, the accommodation space for the spring 306 should be expanded and reduced in response to reciprocating motion of the piston 305. Thus, the communication pipe 9 is provided to achieve smooth air transfer to and from the accommodation space for the spring 306.

The push plate 320 is composed of a flange portion 321 and the rod portion 322 as a rod member. In the second embodiment, the entire push plate 320 is molded integrally by aluminum forging and is intended to reduce the weight thereof. This is shown only as an example. The flange portion 321 and the rod portion 322 may be formed separately and then connected by welding, for example.

As is also shown in FIGS. 7 and 9, a recess 322a is formed at the distal end of the rod portion 322. The pushrod guide 324 is provided to be inserted in the recess 322a. The pushrod guide 324 is made of a material higher in strength than the rod portion 322. As an example, in the second embodiment, the rod portion 322 is made of aluminum so that the pushrod guide 324 can be made of iron, for example. The pushrod guide 324 is made of a material higher in strength than the rod portion 322 for the reason that direct abutting contact of the rod portion 322 with the pushrod 302 easily causes friction. While the pushrod 302 and the rod portion 322 are formed separately in the second embodiment, they may be formed integrally. Integrally forming the pushrod 302 and the rod portion 322 makes the pushrod guide 324 unnecessary.

A fixing ring 326 having an undulating shape along the circumference is located between the recess 322a at the distal end of the rod portion 322 and an outer circumference 324b of the pushrod guide 324. The pushrod guide 324 is attached to the rod portion 322 through the fixing ring 326.

In the second embodiment, the pushrod guide 324 is attached to the rod portion 322 through the fixing ring 326 for the reason that this attachment realizes attachment and removal of the pushrod guide 324 more easily than fixation by press fitting.

The entire length of the rod portion 322 including the pushrod guide 324 might deviate from a designed allowable range due to fluctuations during assembling, for example. This can be adjusted by providing a spacer (not shown) between a bottom surface 22b of the recess 322a and the pushrod guide 324.

If the pushrod guide 324 is press fitted in the recess 322a, for example, it becomes difficult to remove the pushrod guide 324. However, the pushrod guide 324 is attached to the rod portion 322 through the fixing ring 326 as described above, so that the pushrod guide 324 can be removed relatively easily while being attached relatively solidly.

The bushing 323 of an annular shape is provided between the inner circumference of the cylinder 317 and the outer circumference of the rod portion 322. The bushing 323 is fixed to the rod portion 322. While making sliding contact with the inner circumference of the cylinder 317, the bushing 323 makes reciprocating motion within the cylinder 317 together with the rod portion 322.

The bushing 323 is provided for stable reciprocating motion of the rod portion 322. In the second embodiment, the bushing 323 is made of a plastic material. By creating an appropriate clearance between the bushing 323 and the inner circumference of the cylinder 317 or by ensuring an appropriate length in a direction in which the bushing 323 moves, tilt (twist) of the rod portion 322 toward the cylinder 317 is prevented.

The bushing 323 includes a pawl portion 323b formed at the inner circumference of one end thereof (on the side of the distal end of the rod portion 322). The pawl portion 323b engages with the distal end of the rod portion 322. The pushrod guide 324 includes a flange portion 324a, which is configured to hold the pawl portion 323b between the flange portion 324a and the distal end of the rod portion 322.

Specifically, the bushing 323 is attached to the rod portion 322 through the pushrod guide 324. This contributes to cost reduction, compared to a structure in which the bushing 323 is attached by itself to the rod portion 322.

The bushing 323 is described in more detail below. As shown in FIGS. 7, 8A and 8B, the bushing 323 is provided with a slit 323c formed to extend in the direction of a cylinder axis (direction of movement within the cylinder 317). The slit 323c expands the inside diameter of the bushing 323 slightly while the bushing 323 is attached to the rod portion 322, thereby allowing easy attachment.

The bushing 323 includes multiple through holes 323a that extend through the bushing 323 in the direction of the cylinder axis while being arranged at predetermined intervals (at intervals of predetermined phases) along the circumference (around the axis of the rod portion 322). The through holes 323a achieve the following effects.

When the bushing 323 moves within the cylinder 317, air is transferred between a destination and a source of the movement of the bushing 323. Resistance is generated against the movement of the bushing 323 if air is not transferred smoothly, making it impossible to guarantee smooth movement while causing a risk of generating abnormal noise (whistling noise) within the cylinder 317. In particular, in the second embodiment, the dust boot 329 is attached between the rod portion 322 and the cylinder 317 with the intention of preventing entry of foreign matter into the cylinder 317. Thus, space inside the boot is closed so that the aforementioned problem is more likely to occur.

As described above, the bushing 323 includes the multiple through holes 323a, which extend through the bushing 323 in the direction of movement within the cylinder 317 while being arranged along the circumference. Thus, while the bushing 323 moves within the cylinder 317, air is transferred smoothly between a destination and a source of the movement of the bushing 323 through the through holes 323a.

This ensures smooth sliding motion of the rod portion 322 (bushing 323) within the cylinder 317 while avoiding formation of a large clearance between the outer circumferential surface of the bushing 323 and the inner circumferential surface of the cylinder 317. This also prevents generation of abnormal noise within the cylinder 317.

In the second embodiment, the through holes 323a are formed at substantially uniform phase intervals over the circumference. Further, forming a large number of the through holes 323a forms a honeycomb structure as shown in FIGS. 8A and 8B. This effectively reduces the volume of plastic, making it possible to prevent defective molding such as molding shrinkage.

Figure 10:
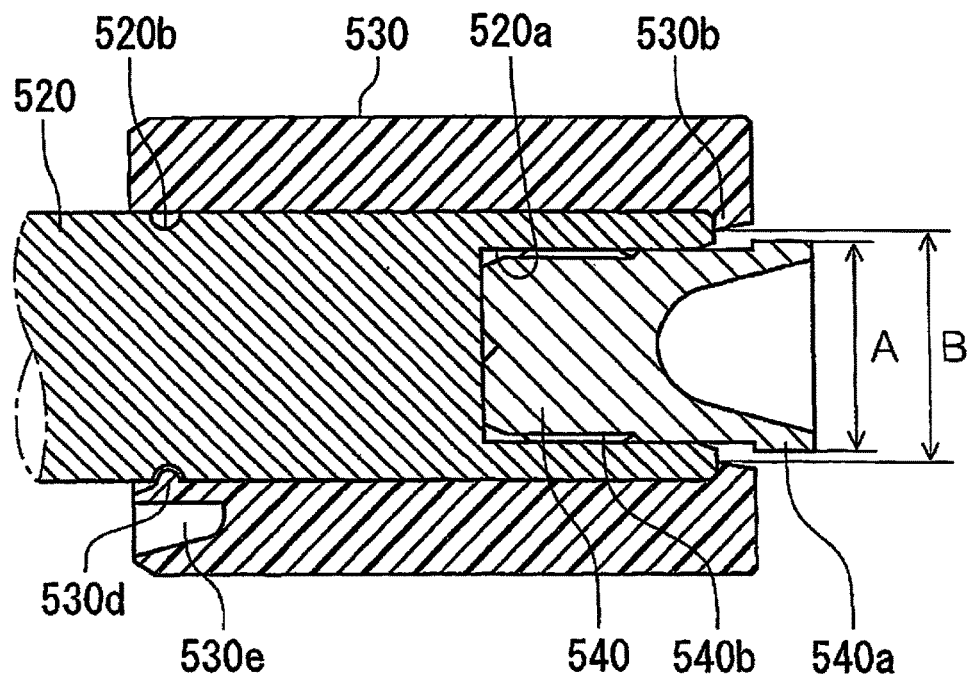
FIG. 10 is a cross-sectional view of a distal end of a rod portion of a different embodiment while a bushing and a pushrod guide of a different embodiment are applied.
Figure 11:
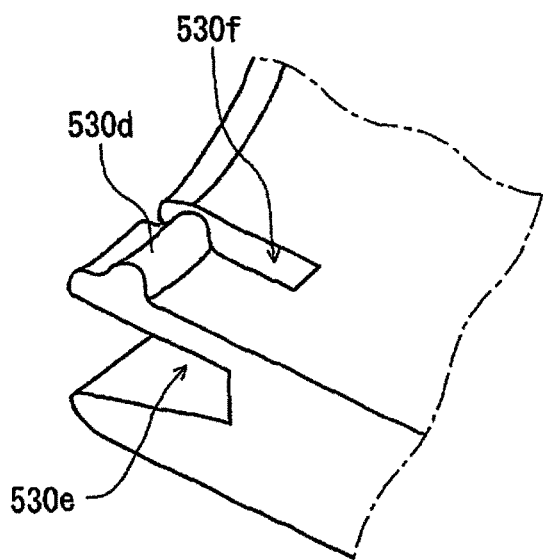
FIG. 11 is a perspective view showing part of the bushing of a different embodiment in an enlarged manner.
Figure 12:
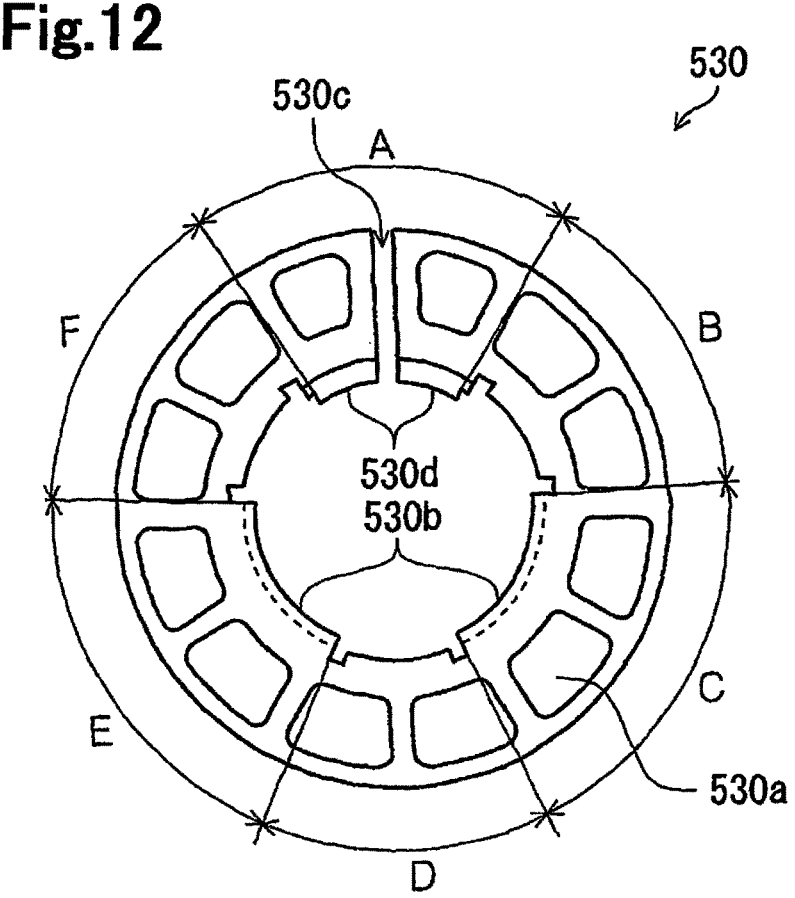
FIG. 12 is a front view of the bushing of a different embodiment.

The bushing 323 may also have a structure shown in FIGS. 10 to 12. FIGS. 10 to 12 show a bushing 530 of a different embodiment. FIG. 10 is a cross-sectional view of a distal end of a rod portion 520 while the bushing 530 and a pushrod guide 540 are applied. FIG. 11 is a perspective view showing part of the bushing 530 in an enlarged manner. FIG. 12 is a front view of the bushing 530.

The bushing 530 differs from the aforementioned bushing 323 mainly in a structure of attaching the bushing 530 to a rod portion. More specifically, like the aforementioned bushing 323, the bushing 530 includes multiple through holes 530a, which extend through the bushing 530 in the direction of a cylinder axis (direction of movement within the cylinder 317) while being arranged along the circumference. Further, a slit 530c is formed to extend in the direction of the cylinder axis.

Unlike the aforementioned rod portion 322, the rod portion 520, to which the bushing 530 is attached, includes a groove 520b formed in the outer circumferential surface thereof to extend in the circumferential direction. Further, a protrusion 530d is formed in the inner circumference of the bushing 530 to extend in the circumferential direction. The protrusion 530d is inserted into the groove 520b, thereby attaching the bushing 530 to the rod portion 520.

As shown in FIGS. 10 and 11, a portion where the protrusion 530d is formed has a hollow portion 330e, and a slit 530f is formed in this portion to extend in the direction of a cylinder axis. This allows the portion with the protrusion 530d to be elastically deformed easily.

Like the aforementioned bushing 323, the bushing 530 includes a pawl portion 530b, which engages with a surface at a distal end of the rod portion 520. The protrusion 530d is formed at one end and the pawl portion 530b is formed at the opposite end of the bushing 530 in the direction of the cylinder axis thereof, and they are arranged to be shifted in phase in the circumferential direction.

FIG. 12 explains this state. An area A shows an area with the protrusion 530d. As shown in FIG. 12, in the present embodiment, the protrusion 530d is formed at opposite sides relative to the slit 530c. The slit 530f shown in FIG. 11 is formed at opposite sides of the area A.

In FIG. 12, an area E and an area C are areas where the pawl portion 530b is formed, an area F, an area D, and an area B are areas where neither the protrusion 530d nor the pawl portion 530b are formed. In the present embodiment, the areas A to F are shifted in phase by about 60 degrees.

As described above, the protrusion 530d and the pawl portion 530b are shifted in phase in the circumferential direction of the bushing 530. This allows easy demolding of the bushing 530 if the bushing 530 is formed by plastic molding, thereby achieving enhanced molding performance.

In the present embodiment, an inside diameter B of the pawl portion 530b is larger than an inside diameter A of a flange portion 540a of the pushrod guide 540 as shown in FIG. 10. If it becomes necessary to replace the bushing 530 as a result of deterioration thereof, for example, the bushing 530 can be removed easily from the rod portion 520.

In the present embodiment, the outer diameter of an outer circumferential surface 540b of the pushrod guide 540 is larger than the inside diameter of a recess 520a of the rod portion 520. Specifically, the pushrod guide 540 is press fitted in the recess 520a. In the present embodiment, further, the outer circumferential surface 540b of the pushrod guide 540 is knurled and unevenness of this knurled portion functions to allow air in the recess 520a to escape during the press fitting, thereby realizing the press fitting easily.

In the present embodiment, the pushrod guide 540 is press fitted in the recess 520a. Hence, it is preferable that the thickness of a peripheral wall of the recess 520a be as thick as possible in consideration of strength (as an example, it is preferable that half of a difference between the outer diameter of the rod portion 520 and the inside diameter of the recess 520a (thickness) do not fall below one tenth of the inside diameter of the recess 520a).

As described above, the specific shape of the bushing to be attached to the rod portion and that of the pushrod guide may be devised in various ways. These shapes are included within the scope of the present invention as long as they do not depart from the purport of the invention.

In a brake chamber including a bushing member arranged between a rod portion that pushes a pushrod and a cylinder, in order to ensure smooth sliding motion of the rod portion (bushing member) within the cylinder, the brake chamber 301 includes the rod portion 322 that makes reciprocating motion within the cylinder 317 through the pressure of compressed air to causes the pushrod 302 to proceed into the brake device, and the bushing 323 located between the rod member 322 and the cylinder 317. The bushing 323 makes reciprocating motion integrally with the rod portion 322 while making sliding contact with the inner circumference of the cylinder 317. The bushing 323 includes the through holes 323a that extend through the bushing 323 in the direction of movement within the cylinder 317 while being arranged along the circumference. This ensures transfer of air between a destination and a source of the movement of the bushing 323.

A third embodiment of the present invention will be described below by referring to the drawings. The third embodiment is described below on condition that it is merely an embodiment of the present invention and is not intended to limit the invention.

Figure 13:
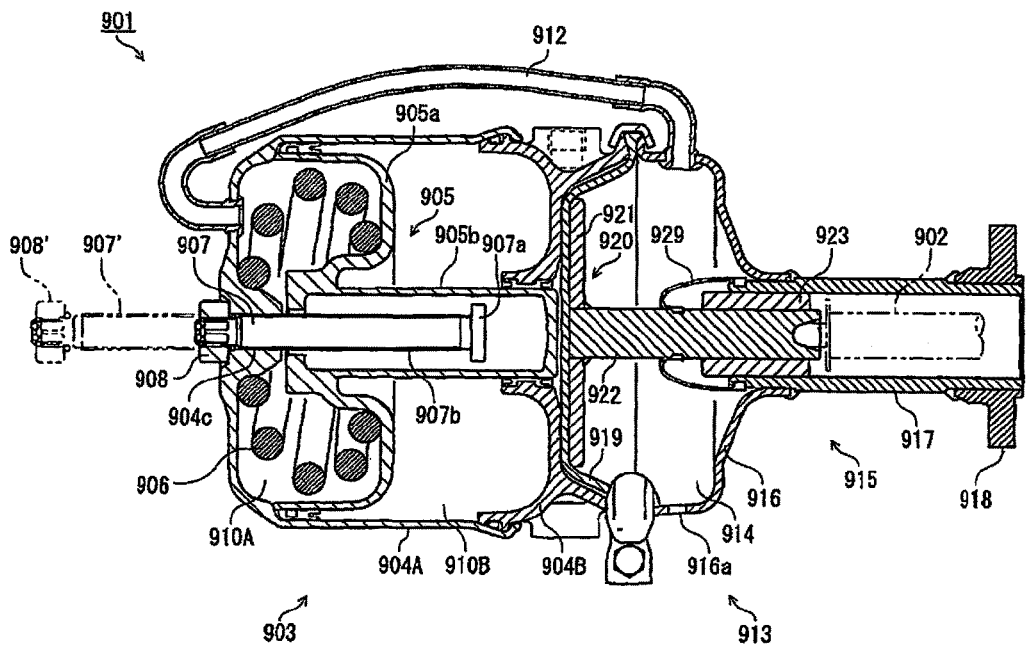
FIG. 13 is a cross-sectional side view of a brake chamber of the present invention.
Figure 14:
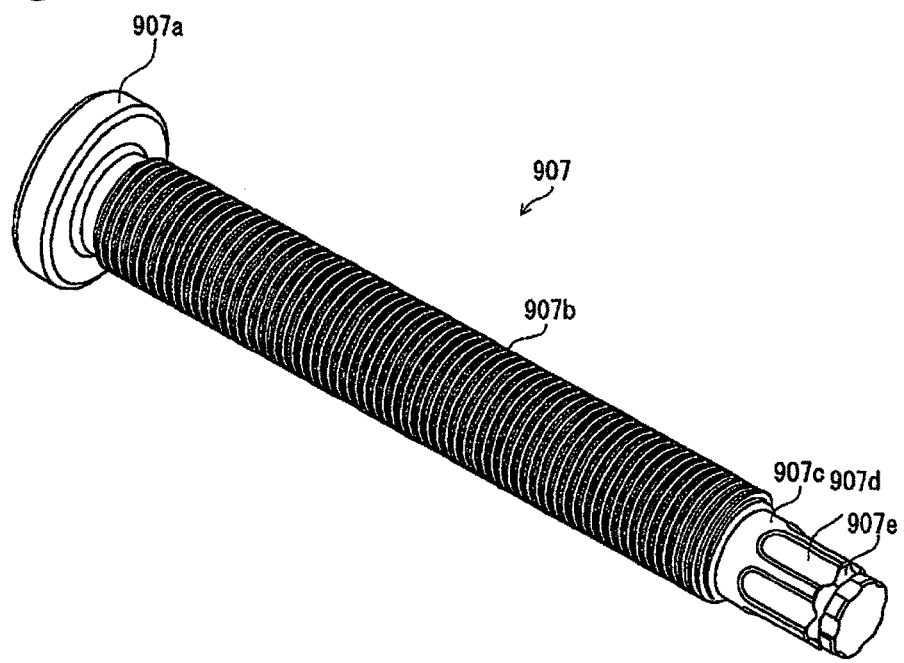
FIG. 14 is a perspective view of a release bolt.
Figure 15:
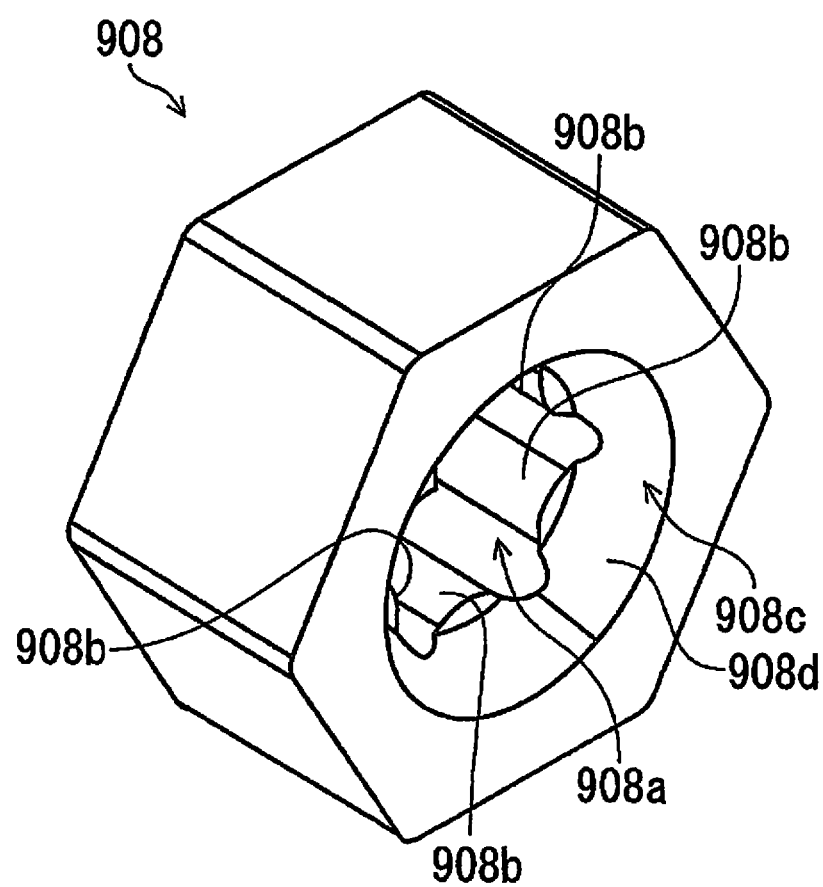
FIG. 15 is a perspective view of a nut.
Figure 16:
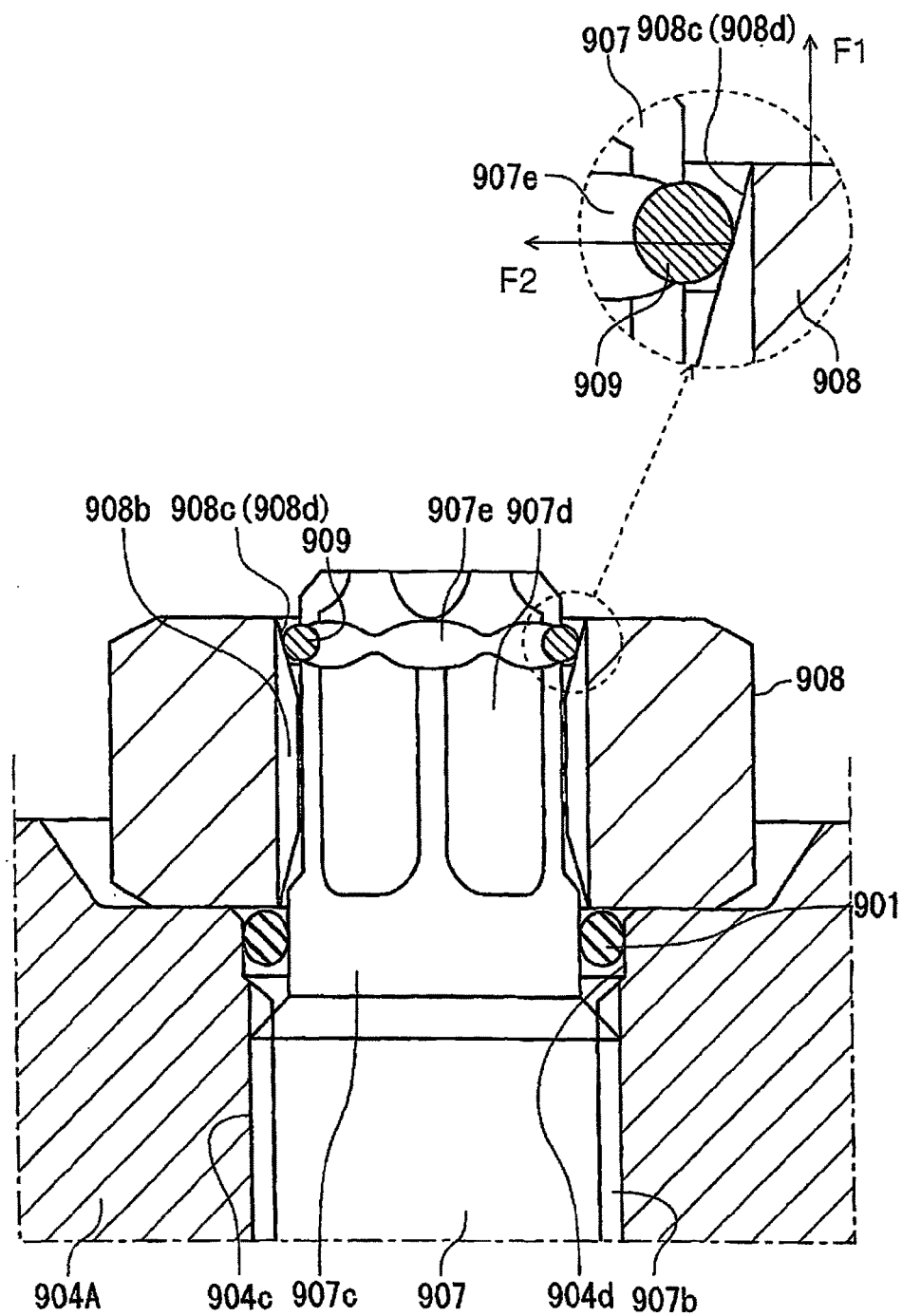
FIG. 16 is a cross-sectional view of an area where the nut is attached.
Figure 17:
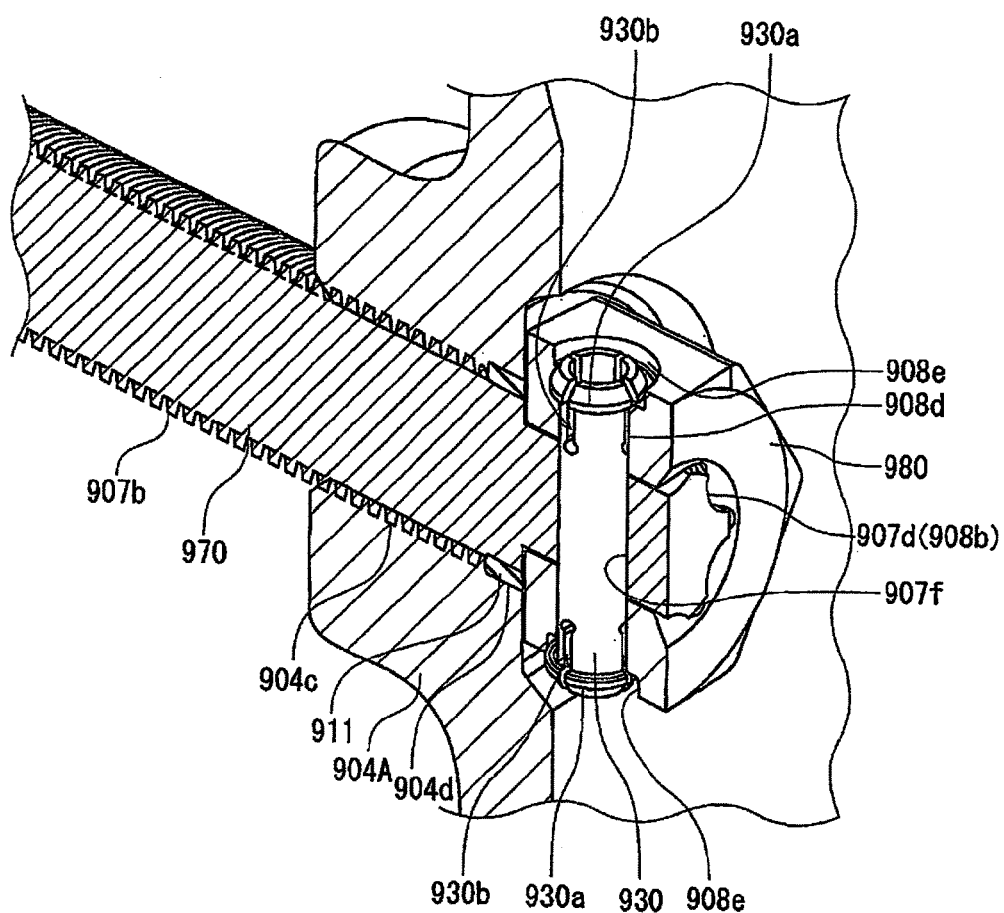
FIG. 17 is a cross-sectional perspective view showing a nut attachment structure of a different embodiment.

FIG. 13 is a cross-sectional side view of a brake chamber 901 of the present invention. FIG. 14 is a perspective view of a release bolt 907. FIG. 15 is a perspective view of a nut 908. FIG. 16 is a cross-sectional view of an area to which the nut 908 is attached. FIG. 17 is a perspective view showing the cross section of a nut attachment structure of a different embodiment.

In FIG. 13, a brake device (not shown) is provided on the right side of the brake chamber 901. A pushrod indicated by a sign 902 proceeds into the brake device to push a brake shoe of the brake device outward, thereby generating braking force.

The brake chamber 901 includes a service brake unit 913 as a service brake, and a spring brake unit 903 as a parking brake. One of the service brake unit 913 and the spring brake unit 903 pushes the pushrod 902 toward the brake device.

In the spring brake unit 903, a housing 904A and a housing 904B are connected to define an accommodation space for a spring 906 and a piston 905. The piston 905 of the spring brake unit 903 includes a piston flange portion 905a and a piston cylinder portion 905b. The spring 906 provided between the piston flange portion 905a and the housing 904A urges the piston cylinder portion 905b in a direction in which the piston cylinder portion 905b presses a push plate 920 of the service brake unit 913.

A space inside the housings 904A and 904B is divided by the piston flange portion 905a into a spring accommodation space 910A where the spring 906 is arranged and a pressure space 910B for compressed air opposite to the spring accommodation space 910A. Air tightness is maintained to prevent transfer of air between these spaces. A compressed air supply means (not shown) supplies compressed air into the pressure space 910B. In a non-braking state, the pressure of the compressed air causes the piston flange portion 905a to contract the spring 306, as shown in FIG. 13. In response to parking brake operation, the compressed air in the pressure space 910B is removed so the urging force of the spring 906 acts to cause the piston 905 to push the pushrod 902 through the push plate 920, thereby generating a brake activated state.

The release bolt 907 is threaded in a bolt hole 904c provided at a central portion of the housing 904A. One end of the release bolt 907 is placed inside the piston cylinder portion 905b of the piston 905.

A bolt flange portion 907a is formed at a distal end of the release bolt 907 placed inside the hollow piston cylinder portion 905b. Rotating the nut 908 attached to the opposite end of the release bolt 907 (protruding out of the housing 904A) allows the piston 905 to be moved manually to the left of FIG. 13, specifically in a brake cancelling (releasing) direction against the urging force of the spring 906. Specifically, even if a failure occurs in a supply circuit for compressed air, the spring brake can be cancelled manually.

In FIG. 13, components with signs 907' and 908' indicated by phantom lines mean the release bolt and the nut respectively in a brake cancelling position.

In the service brake unit 913, the housing 904B forming the spring brake unit 903 and a base 915 define an accommodation space for the push plate 920 and a diaphragm 919.

In an exemplary structure of the base 915, the base 915 is divided into a cup 916 as a housing, a base cylinder 917, and a base flange 918. The base cylinder 917 has a first end to which the base flange 918 is welded and a second end to which the cup 916 is welded, so that the cup 916, the base cylinder 917, and the base flange 918 are integrated.

The connection portion between the base cylinder 917 and the cup 916, more specifically a distal end of the base cylinder 917 is slightly inserted in the cup 916. In this state, the base cylinder 917 and the cup 916 are fixed to each other.

As described above, the base 915 is divided into the cup 916, the base cylinder 917, and the base flange 918. This makes it possible to respond to change of specifications easily, compared to a structure in which the entire base 915 is formed as an integral member. As an example, the entire length of the base 915 can be changed only by changing the length of the base cylinder 917 while using the cup 916 and the base flange 918 as they are. Further, a position where an opening 916a (described below) is formed can be changed only by changing the specifications of the cup 916 while using the base cylinder 917 and the base flange 918 as they are. Additionally, the positions of the opening 916a (described below) and a fastening hole (not shown) in the base flange 918 relative to each other can be changed easily.

The diaphragm 919 is held in a suspended manner between the housing 904B and the cup 916. Compressed air is supplied to between the diaphragm 919 and the housing 904B through a compressed air supply port (not shown). Supply of the compressed air to between the diaphragm 919 and the housing 904B deforms the diaphragm 919 to push the pushrod 902 through the push plate 920, thereby activating the brake.

The cup 916 is provided with the opening 916a communicating with the outside of the cup 916, so that internal space 914 of the service brake unit 913 defined by the housing 904B and the cup 916 can be expanded and reduced in accordance with deformation of the diaphragm 919.

Hence, foreign matter such as mud or dirt may enter the internal space 914 through the opening 916a and then invade the inside of the base cylinder 917, causing a risk of inhibiting smooth sliding motion of a bushing 923. In this respect, a dust boot 929 made of an elastically deformable material (such as rubber) and formed into a dome shape is fixed as a boot member between the base cylinder 917 and a rod portion 922.

A sign 912 shows a communication pipe connecting the accommodation space 910A for the spring 906 in the spring brake unit 903 and the internal space 914 of the service brake unit 913. Specifically, the accommodation space 910A for the spring 906 in the spring brake unit 903 is basically sealed hermetically in order to prevent deterioration of the spring 906 due to moisture and the like. Meanwhile, the accommodation space 910A for the spring 906 should be expanded and reduced in response to reciprocating motion of the piston 905. Thus, the communication pipe 912 is provided to achieve smooth air transfer to and from the accommodation space 910A for the spring 906.

The push plate 920 is composed of a plate flange portion 921 and the rod portion 922 as a rod member. The bushing 923 of an annular shape is provided between the inner circumference of the base cylinder 917 and the outer circumference of the rod portion 922. The bushing 923 is fixed to the rod portion 922. While making sliding contact with the inner circumference of the base cylinder 917, the bushing 923 makes reciprocating motion within the base cylinder 917 together with the rod portion 922.

The bushing 923 is provided for stable reciprocating motion of the rod portion 922. In the present embodiment, the bushing 923 is made of a plastic material. By creating an appropriate clearance between the bushing 923 and the inner circumference of the base cylinder 917 or by ensuring an appropriate length in a direction in which the bushing 923 moves, tilt (twist) of the rod portion 922 toward the base cylinder 917 is prevented.

The entire structure of the brake chamber 901 is as described above. In the below, the attachment structure of the nut 908 to the release bolt 907 is described in more detail.

As shown in FIG. 14, the release bolt 907 includes a screw portion 907*b*. As described above, the screw portion 907*b* is threaded in the bolt hole 904*c* provided in the housing 904A. The release bolt 907 has a first end, at which the aforementioned bolt flange portion 907*a* is formed, and a second end, at which a cylindrical surface 907*c* as a bolt-side sealing surface, recessed grooves 907*d*, and a recess 907*e* are formed in this order as viewed from the screw portion 907*b*.

The cylindrical surface 907*c* is a smooth cylindrical surface with no protrusions or recesses. The recessed grooves 907*d* are multiple grooves extending in the longitudinal direction (direction of the axis) of the release bolt 907 while being arranged at regular intervals in the circumferential direction of the release bolt 907, thereby forming what is called a hexalobular shape in the present embodiment. The recess 907*e* is a groove extending in the circumferential direction of the release bolt 907.

As shown in FIG. 15, the nut 908 includes multiple protrusions 908*b* formed on the inner circumference of a bolt insertion hole 908*a*. The protrusions 908*b* extend in the direction of an axis defined when the nut 908 is attached to the release bolt 907 while being arranged at regular intervals in the circumferential direction. The protrusions 908*b* are inserted into the recessed grooves 907*d* of the release bolt 907 when the nut 908 is attached to the release bolt 907.

In the present embodiment, the nut 908 is not press fitted in the release bolt 907 but it is attached such that a slight clearance is maintained between the protrusions 908*b* and the recessed grooves 907*d* (in what is called a loosely fitted manner). Thus, while a detent of the nut 908 is formed reliably by the protrusions 908*b* and the recessed grooves 907*d*, the nut 908 can be removed easily during disassembly.

In the nut 908, a recess 908*c* is formed on opposite sides of the bolt insertion hole 908*a*, and an inner circumferential surface 908*d* of the recess 908*c* has a slanting shape that makes the inner circumferential surface 908*d* expand outwardly.

For attachment of the nut 908 to the release bolt 907 of the aforementioned structures, the nut 908 is first inserted into an end of the release bolt 907. In this state, the recess 907*e* of the release bolt 907 is placed outside the bolt insertion hole 908*a* (at the recess 908*c*). Thus, a stopper ring 909 is fitted into the recess 907*e* of the release bolt 907 in this state. The stopper ring 909 has a C-shape, and can be fitted into the recess 907*e* by being expanded.

FIG. 16 shows a state in which the nut 908 is attached to the release bolt 907 in the aforementioned manner. As shown in FIG. 16, the outer diameter of the stopper ring 909 is larger than the inside diameter of the bolt insertion hole 908*a*, so that the nut 908 is retained with the stopper ring 909.

As described above, the nut 908 is retained with the stopper ring 909 accommodated in the recess 908*c*, so that the nut 908 can be attached easily to the release bolt 907. During disassembly, the nut 908 can be removed easily by removing the stopper ring 909.

Additionally, the stopper ring 909 is accommodated in the recess 908*c* of the nut 908. This makes the release bolt 907 protrude from the nut 908 by a small amount, thereby contributing to the size reduction of the system.

As shown in the enlarged view of the stopper ring 909 of FIG. 16, the inner circumferential surface 908*d* of the recess 908*c* of the nut 908 facing the stopper ring 909 has an inclined shape that makes the inner circumferential surface 908*d* expand outwardly of the nut 908 (toward the top of FIG. 16). Thus, if the nut 908 tries to move in a direction (arrow F1) in which the nut 908 comes off, the inner circumferential surface 908*c* functions to press the stopper ring 909 from the outside (arrow F2).

Specifically, the stopper ring 909 is pressed in a direction (direction in which the diameter thereof shrinks) opposite to a direction in which the stopper ring 909 is removed (direction in which the stopper ring 909 expands). Thus, the greater the extent of coming-off action of the nut 908, the more enhanced the stopper function of the stopper ring 909 becomes. This ensures sufficient retaining strength after the nut 908 is attached, so that the nut 908 does not come off easily.

As shown in FIG. 16, when the nut 908 is attached to the release bolt 907 and the release bolt 907 is in a normal position (position of FIGS. 13 and 16, where the release bolt 907 does not restrain the piston 905), a sealing ring 911 is formed between the cylindrical surface (bolt-side sealing surface) 907*c* of the release bolt 907 and a housing-side sealing surface 904*d* of the housing 904A and this sealing ring 911 realizes sealing function.

Specifically, shaft sealing function is realized in an area further inward of the chamber than the nut 908. Thus, both moisture entering the chamber from between the release bolt 907 and the nut 908 and moisture entering the chamber from between the nut 908 and the housing 904A are dealt with by one sealing means, thereby contributing to simplification and cost reduction of the structure.

A different embodiment will be described next by referring to FIG. 17. In FIG. 17, structures corresponding to those of the aforementioned embodiment are identified by the same signs and descriptions thereof will be omitted.

The embodiment shown in FIG. 17 differs from the aforementioned embodiment mainly in that it uses a plastic pin 930 for retaining the nut 980.

Specifically, a through hole 907*f* is formed in an end of a release bolt 970 to extend through the release bolt 970 in the direction of the diameter thereof. A through hole 908*d* is also formed in a nut 980 to extend through the nut 980 in the direction of the diameter thereof. The through holes 907*f* and 908*d* allow the plastic pin 930 to extend therethrough to retain the nut 980.

The plastic pin 930 is made of a plastic material and has a hollow shape. Opposite ends of the plastic pin 930 are each provided with a pin flange portion 930*a* and multiple slits 930*b*. Thus, the opposite ends of the plastic pin 930 easily shrink in diameter when the plastic pin 930 is inserted, so that the plastic pin 930 can be inserted easily. Additionally, the pin flange portions 930*a* engage with edge areas of the through hole 908*d* of the nut 980 to prevent the plastic pin 930 from falling off easily. The pin flange portions 930a of the plastic pin 930 are accommodated in recesses 908e of the nut 980. This prevents the opposite ends of the plastic pin 930 from protruding out of the nut 980 in an assembled condition. In the present embodiment, the plastic pin 930 is made of a plastic material. The plastic pin 930 may also be made of a metal material or other materials with the intention of increasing its strength.

The aforementioned attachment structure of the nut to the release bolt is merely an example and may be devised in various ways. These structures are included within the scope of the present invention as long as they do not depart from the purport of the invention.

In order to obtain a brake chamber with a nut attachment structure that allows a nut to be attached to and separated from a release bolt easily while making it possible to maintain sufficient retaining strength after attachment of the nut, the brake chamber 901 includes the spring brake unit 903 and the service brake unit 913. The spring brake unit 903 includes the piston 905 for activating a brake, the spring 906 for urging the piston 905, and the release bolt 907 for cancelling a brake. The nut 908 provided at an end of the release bolt 907 is retained with the stopper ring 909, which is accommodated in the recess 908c of the nut 908. The inner circumferential surface 908d of the recess 908c has a slanting shape that makes the inner circumferential surface 908d expand outwardly of the nut 908.

DESCRIPTION OF THE REFERENCE NUMERALS 1, 301, 901 Brake chamber
2, 302, 902 Pushrod
3, 303, 903 Spring brake unit
4A, 5B, 304A, 304B, 904A, 904B Housing
5, 305, 905 Piston
6, 306, 906 Spring
7, 307, 907 Release bolt
8, 308, 908 Nut
9, 309, 912 Communication pipe
13, 313, 913 Service brake unit
15, 315, 915 Base
16, 316, 916 Cup
16b Inner circumferential surface
17, 317 Cylinder
18, 318 Flange
19, 319, 919 Diaphragm
20, 320, 920 Push plate
21, 321 Flange portion
22, 322, 922 Rod portion
23, 323, 923 Bush
29, 329, 929 Dust boot
29c Sealing portion
324 Pushrod guide
326 Fixing ring
520 Rod portion (second embodiment)
530 Bushing (second embodiment)
540 Pushrod guide (second embodiment)
909 Stopper ring
910A Spring accommodation space
910B Pressure space
911 Sealing ring
914 Internal space
917 Base cylinder
918 Base flange
921 Plate flange portion
930 Plastic pin

The invention claimed is:

1. A brake chamber, comprising:
a rod member that makes reciprocating motion within a cylinder through a pressure of compressed air or an urging force of a spring, thereby causing a pushrod for activating a brake device of a vehicle to proceed into the brake device;
a diaphragm that deforms in response to supply of the compressed air to push the rod member;
a housing that forms an accommodation space for the diaphragm, wherein the housing is connected to the cylinder with a first end of the cylinder being inserted in the housing; and
a boot member having a first end connected to the cylinder and a second end connected to the rod member, wherein the boot member functions to prevent entry of foreign matter into the cylinder,
wherein the boot member includes a sealing portion that contacts an inner circumferential surface of the housing thereby preventing entry of foreign matter into a connection portion between the housing and the cylinder,
the sealing portion is formed integrally with the boot member,
the sealing portion extends from the first end of the boot member along the inner circumferential surface of the housing by a distance, and contacts the inner circumferential surface of the housing at a position beyond the distal end of the cylinder in an axial direction of the cylinder, and
the sealing portion has a structure to receive a force acting in a direction to cause the sealing portion to contact the inner circumferential surface of the housing in response to pressure applied from outside of a sealed space.

2. A boot member used in a brake chamber, wherein the brake chamber includes:
a rod member that makes reciprocating motion within a cylinder through a pressure of compressed air or an urging force of a spring, thereby causing a pushrod for activating a brake device of a vehicle to proceed into the brake device;
a diaphragm that deforms in response to supply of the compressed air to push the rod member; and
a housing that forms an accommodation space for the diaphragm, wherein the housing is connected to the cylinder with a first end of the cylinder being inserted in the housing,
the boot member is fixed between the first end of the cylinder and the rod member and functions to prevent entry of foreign matter into the cylinder, and
the boot member includes a sealing portion that contacts an inner circumferential surface of the housing thereby preventing entry of foreign matter into a connection portion between the housing and the cylinder,
the sealing portion is formed integrally with the boot member,
the sealing portion extends from the first end of the boot member along the inner circumferential surface of the housing by a distance, and contacts the inner circumferential surface of the housing at a position beyond the distal end of the cylinder in an axial direction of the cylinder, and
the sealing portion has a structure to receive a force acting in a direction to cause the sealing portion to contact the inner circumferential surface of the housing in response to pressure applied from outside of a sealed space.

3. A brake chamber comprising:
a rod member that makes reciprocating motion within a cylinder through a pressure of compressed air or an urging force of a spring, thereby causing a pushrod for activating a brake device of a vehicle to proceed into the brake device; and
a bushing member located between an outer circumference of the rod member and an inner circumference of the cylinder, wherein the bushing member makes reciprocating motion integrally with the rod member while making sliding contact with the inner circumference of the cylinder, and
a pushrod guide, which engages with the pushrod, formed at a distal end of the rod member, the pushrod guide having a protruding shape to be inserted in a recess formed at the distal end of the rod member, and being fixed to the rod member with a fixing ring, which is located between the recess and the protruding shape, the pushrod guide being made of a material higher in fatigue strength than the rod member,
wherein the bushing member includes a pawl portion, which engages with the distal end of the rod member, and the pawl portion is located between a flange portion of the pushrod guide and the distal end of the rod member, and
the bushing member includes a plurality of through holes that extends through the bushing member in a direction of movement within the cylinder and is arranged in a circumferential direction.

4. The brake chamber according to claim 3, further comprising:
a diaphragm that deforms in response to supply of the compressed air to push the rod member;
a housing that forms an accommodation space for the diaphragm, wherein the housing is connected to the cylinder with a first end of the cylinder being inserted in the housing; and
a boot member having a first end connected to the cylinder and a second end connected to the rod member, wherein the boot member functions to prevent entry of foreign matter into the cylinder.

5. A brake chamber comprising:
a rod member that makes reciprocating motion within a cylinder through a pressure of compressed air or an urging force of a spring, thereby causing a pushrod for activating a brake device of a vehicle to proceed into the brake device;
a bushing member located between an outer circumference of the rod member and an inner circumference of the cylinder, wherein the bushing member makes reciprocating motion integrally with the rod member while making sliding contact with the inner circumference of the cylinder, and the bushing member includes a plurality of through holes that extends through the bushing member in a direction of movement within the cylinder and is arranged in a circumferential direction, and
a pushrod guide, which engages with the pushrod, formed at a distal end of the rod member, wherein the pushrod guide is made of a material higher in fatigue strength than the rod member,
the rod member has a groove formed in a circumferential direction,
the bushing member has a protrusion to be inserted in the groove,
insertion of the protrusion into the groove attaches the bushing member to the rod member,
the bushing member further has a pawl portion, which engages with the distal end of the rod member, and
the protrusion and the pawl portion are shifted in phase in a circumferential direction of the bushing member.

6. A bushing member used in a brake chamber, wherein
the brake chamber includes a rod member that makes reciprocating motion within a cylinder through a pressure of compressed air or an urging force of a spring, thereby causing a pushrod for activating a brake device of a vehicle to proceed into the brake device,
the bushing member is located between an outer circumference of the rod member and an inner circumference of the cylinder, wherein the bushing member makes reciprocating motion integrally with the rod member while making sliding contact with the inner circumference of the cylinder, the bushing member including a plurality of through holes that extends through the bushing member in a direction of movement within the cylinder and is arranged in a circumferential direction,
the brake chamber also includes a pushrod guide, which engages with the pushrod, formed at a distal end of the rod member, wherein the pushrod guide is made of a material higher in fatigue strength than the rod member, the pushrod guide having a protruding shape to be inserted in a recess formed at the distal end of the rod member, and the pushrod guide being fixed to the rod member with a fixing ring, which is located between the recess and the protruding shape, and
the bushing member includes a pawl portion, which engages with the distal end of the rod member, and the pawl portion is located between a flange portion of the pushrod guide and the distal end of the rod member.

7. A brake chamber configured to include a flange portion and a hollow cylinder portion extending from the flange portion, wherein the flange portion divides the inside of a housing into an accommodation space for a spring and a pressure space for compressed air, the brake chamber comprising:
a piston that causes a pushrod to proceed into a brake device of a vehicle, wherein the pushrod activates the brake device by an urging force of the spring;
a release bolt threaded in a bolt hole formed in the housing, wherein the release bolt has a first end inserted in the cylinder and a second end protruding out of the housing, and, wherein, when the release bolt is rotated, the first end displaces the piston against the urging force of the spring to a position where braking by the brake device is released;
a nut having an insertion hole for receiving an end at the second end of the release bolt, wherein the nut is fixed to the second end of the release bolt; and
a stopper ring having an outer diameter larger than an inside diameter of the insertion hole, wherein the stopper ring is attached to the second end of the release bolt with the second end inserted in the insertion hole, thereby preventing the nut from coming off the release bolt,
the stopper ring is accommodated in a recess formed in the nut, and
an inner circumferential surface of the recess that faces the stopper ring has a slanting shape that makes the inner circumferential surface expand outwardly of the nut.

8. The brake chamber according to claim 7, wherein
the second end of the release bolt has an outer circumference of a shape with protrusions and recesses defined in a circumferential direction, and the insertion hole of the nut has a shape with protrusions and recesses that are fitted to the shape with the protrusions and recesses of the release bolt with a certain gap left between the shapes.

9. The brake chamber according to claim 7, wherein
a bolt-side sealing surface is formed at the second end of the release bolt at a position further inward of the chamber than a place where the nut is attached,
a housing-side sealing surface facing the bolt-side sealing surface is formed in the housing at a position further outward of the chamber than a terminal end position of the bolt hole, and
a sealing ring is provided between the bolt-side sealing surface and the housing-side sealing surface, thereby realizing sealing function in an area further inward of the chamber than the nut.

10. A bushing member used in a brake chamber, wherein
the brake chamber includes a rod member that makes reciprocating motion within a cylinder through a pressure of compressed air or an urging force of a spring, thereby causing a pushrod for activating a brake device of a vehicle to proceed into the brake device,
the bushing member is located between an outer circumference of the rod member and an inner circumference of the cylinder, wherein the bushing member makes reciprocating motion integrally with the rod member while making sliding contact with the inner circumference of the cylinder,
the bushing member further comprises a plurality of through holes that extends through the bushing member in a direction of movement within the cylinder and is arranged in a circumferential direction,
the brake chamber further comprises a pushrod guide, which engages with the pushrod, formed at a distal end of the rod member, wherein the pushrod guide is made of a material higher in fatigue strength than the rod member,
the rod member has a groove formed in a circumferential direction,
the bushing member has a protrusion to be inserted in the groove,
insertion of the protrusion into the groove attaches the bushing member to the rod member,
the bushing member further has a pawl portion, which engages with the distal end of the rod member, and
the protrusion and the pawl portion are shifted in phase in a circumferential direction of the bushing member.

11. The brake chamber according to claim 7, wherein the release bolt has a recess that extends in the circumferential direction of the release bolt, and the stopper ring is fitted into the recess of the release bolt.

12. The brake chamber according to claim 7, wherein the release bolt extends in an axial direction and the stopper ring is accommodated in the nut in the axial direction.

* * * * *